(12) United States Patent
Kim et al.

(10) Patent No.: US 8,180,370 B2
(45) Date of Patent: May 15, 2012

(54) MOBILE TERMINAL AND METHOD OF DISPLAY POSITION ON MAP THEREOF

(75) Inventors: Jong-Hwan Kim, Seoul (KR); Myung-Joo Chae, Seoul (KR); Hee Won Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 611 days.

(21) Appl. No.: 12/391,496

(22) Filed: Feb. 24, 2009

(65) Prior Publication Data

US 2010/0093367 A1    Apr. 15, 2010

(30) Foreign Application Priority Data

Oct. 10, 2008    (KR) .................... 10-2008-0099417

(51) Int. Cl.
*H04W 24/00* (2009.01)

(52) U.S. Cl. .................. 455/456.1; 701/211; 455/187.1
(58) Field of Classification Search ............... 455/456.1
See application file for complete search history.

(56) References Cited

U.S. PATENT DOCUMENTS

2006/0271287 A1* 11/2006 Gold et al. .................... 701/211
2007/0252689 A1* 11/2007 Rothschild ............... 340/539.13
* cited by examiner

*Primary Examiner* — Nick Corsaro
*Assistant Examiner* — Gerald Johnson
(74) *Attorney, Agent, or Firm* — Birch, Stewart, Kolasch & Birch, LLP

(57) ABSTRACT

A method of controlling a mobile terminal, and which includes displaying contents in a first region of a display on the mobile terminal, deriving position information from the contents displayed in the first region, and displaying a map including a position corresponding to the derived position information in a second region of the display on the mobile terminal.

24 Claims, 27 Drawing Sheets

FIG. 7A

| Header information | |
|---|---|
| ⋮ | ⋮ |
| Photographing date | 2008/09/23 17:55 |
| Photographing place | Gangnam station |
| ⋮ | ⋮ |

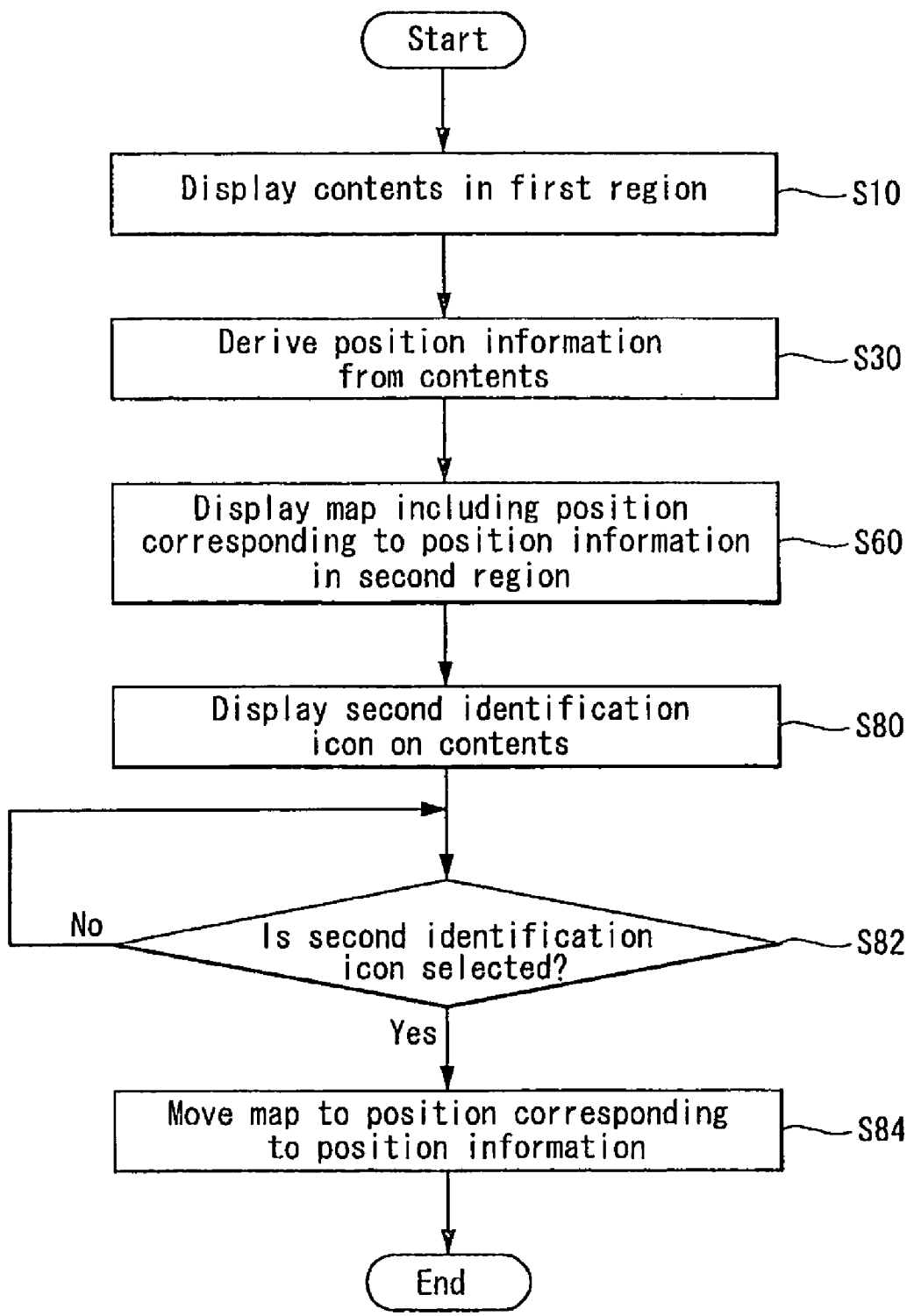

MOBILE TERMINAL AND METHOD OF DISPLAY POSITION ON MAP THEREOF

The present application claims priority to Korean Application No. 10-2008-0099417 filed in Korea on Oct. 10, 2008, the entire contents of which are hereby incorporated by reference in their entirety.

BACKGROUND OF THE INVENTION

1. Field of the Invention

The present invention relates to a mobile terminal and a method of displaying a position corresponding to position information included in contents on a map of the mobile terminal.

2. Discussion of the Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

In addition, terminals can be divided into mobile terminals and stationary terminals. The mobile terminals can be classified into handheld terminals and vehicle mount terminals according to whether users can personally carry the terminals.

Terminal users can also send contents such as text messages, videos, music files, etc. between each other. However, the contents are generally viewed and discarded and provide limited information.

SUMMARY OF THE INVENTION

Accordingly, one object of the present invention is to address the above-noted and other drawbacks of the related art.

Another object of the present invention is to provide a mobile terminal and a method of easily displaying a position corresponding to position information included in contents on a map of the mobile terminal.

To achieve these and other advantages and in accordance with the purpose of the present invention, as embodied and broadly described herein, the present invention provides in one aspect a method of controlling a mobile terminal, and which includes displaying contents in a first region of a display on the mobile terminal, deriving position information from the contents displayed in the first region, and displaying a map including a position corresponding to the derived position information in a second region of the display on the mobile terminal.

In another aspect, the present invention provides a mobile terminal including a display unit configured to display contents in a first region of the display unit, and a controller configured to derive position information from the contents displayed in the first region, and to control the display unit to display a map including a position corresponding to the derived position information in a second region of the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7A is an overview of a header of an image according to an embodiment of the present invention;

FIG. 15 is a flow chart illustrating a method of displaying a position on a map according to a third embodiment of the present invention.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, the embodiments are provided so that this disclosure will be thorough and complete, and will fully convey the concept of the invention to those skilled in the art.

Hereinafter, a mobile terminal relating to an embodiment of the present invention will be described below in more detail with reference to the accompanying drawings. In addition, the mobile terminal according to embodiments of the present invention can include a cellular phone, a smart phone, a laptop computer, a digital broadcasting terminal, personal digital assistants (PDA), a portable multimedia player (PMP), a navigation system and so on.

Figure 1:
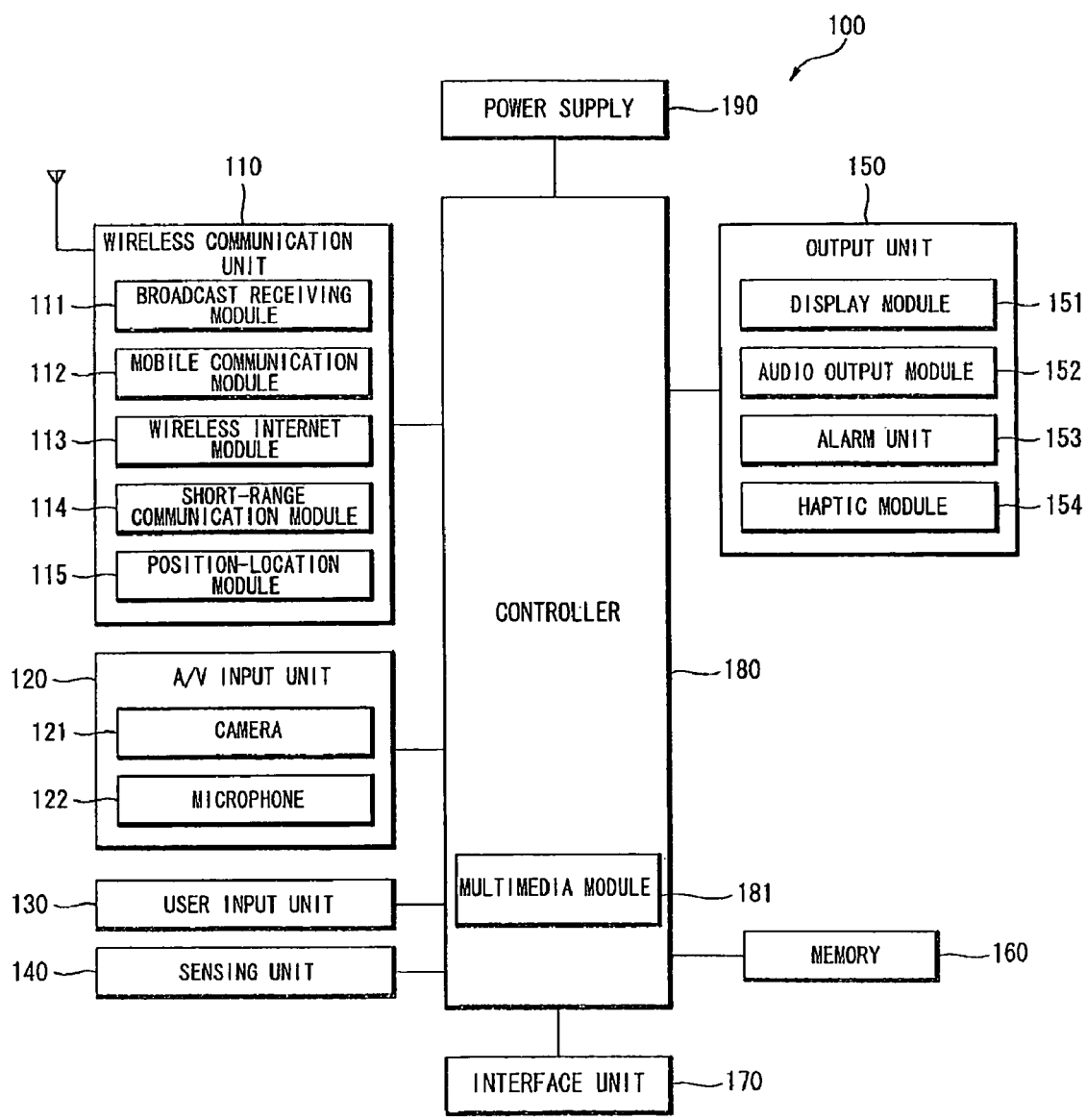
FIG. 1 is a block diagram of a mobile terminal according to an embodiment of the present invention.

FIG. 1 is a block diagram of a mobile terminal 100 according to an embodiment of the present invention. As shown, the mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 can be included or excluded as necessary and the number of components included in the mobile terminal can be varied. Further, the terms module and unit may be used interchangeably when describing some of the components.

In addition, the radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

Also, the broadcasting related information can be information on a broadcasting channel, a broadcasting program or a broadcasting service provider, and can be provided even through a mobile communication network. In this instances, the broadcasting related information can be received by the mobile communication module 112.

The broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

Further, the broadcasting receiving module 111 receives broadcasting signals using various broadcasting systems. For example, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H system and the integrated services digital broadcast-terrestrial (ISDB-T) systems. The broadcasting receiving module 111 can also be constructed to be suited to broadcasting systems providing broadcasting signals other than the above-described digital broadcasting systems. In addition, the broadcasting signals and/or broadcasting related information received through the broadcasting receiving module 111 can be stored in the memory 160.

Further, the mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

Also, the wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. Further, the local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to a latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

Further, the image frames processed by the camera 121 can be stored in the memory 160 or transmitted to an external device through the radio communication unit 110. The mobile terminal 100 can also include at least two cameras according to constitution of the terminal.

In addition, the microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. Also, the microphone 122 can employ various noise removal algorithms for removing noise generated when the external audio signal is received.

Further, the user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone, can sense whether the power supply 190 supplies power and whether the interface 170 is connected to an external device, etc. The sensing unit 140 can also include a proximity sensor.

Further, the output unit 150 generates visual, auditory or tactile output and can include the display unit 151, an audio output module 152, an alarm 153 and a haptic module 154. The display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display, a three-dimensional display, a transparent display, etc.

That is, some of these displays can be of a transparent type or a light transmission type, which is referred to as a transparent display. In more detail, the transparent display includes a transparent liquid crystal display. The rear structure of the display unit 151 can also be of the light transmission type. Accordingly, a user can see an object located behind the body of the mobile terminal 100 through the display unit 151.

The mobile terminal 100 can also include at least two display units 151 according to constitution of the terminal. For example, the mobile terminal 100 can include a plurality of displays that are arranged on a single face at a predetermined distance or integrated. The plurality of displays can also be arranged on different sides of the terminal.

When the display unit 151 and a sensor sensing touch (referred to as a touch sensor hereinafter) form a layered structure, which is referred to as a touch screen hereinafter, the display unit 151 can be used as an input device in addition to an output device. Further, the touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can also be constructed such that it can sense pressure of touch as well as the position and area of touch.

When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring again to FIG. 1, the proximity sensor included in the sensing unit 140 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor also has a lifetime longer than that of a contact sensor and has wide applications.

Further, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

Further, a capacitive touch screen is constructed such that a proximity of a pointer is detected through a variation in an electric field according to the proximity of the pointer. In this instance, the touch screen (touch sensor) can be classified as a proximity sensor.

In addition, an action of approaching the pointer to the touch screen while the pointer is not in contact with the touch screen such that location of the pointer on the touch screen is recognized will be referred to as a "proximity touch" and an action of bring the pointer into contact with the touch screen will be referred to as a "contact touch" in the following description. Further, a proximity touch point of the pointer on the touch screen corresponds to a point of the touch screen to which the pointer corresponds perpendicularly to the touch screen when the pointer proximity-touches the touch screen.

The proximity sensor also senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

Further, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating a generation of an event of the mobile terminal 100. Examples of events generated in the mobile terminal include receiving a call signal, receiving a message, inputting a key signal, inputting touch, etc. The alarm 153 can output signals in forms different from video signals or audio signals, for example, a signal for indicating generation of an event through vibration. The video signals or the audio signals can also be output through the display unit 151 or the audio output module 152.

Further, the haptic module 154 generates various haptic effects that the user can feel. A representative example of the haptic effects is vibration. The intensity and pattern of vibration generated by the haptic module 154 can also be controlled. For example, different vibrations can be combined and output or can be sequentially output.

In addition, the haptic module 154 can generate a variety of haptic effects including an effect of stimulus according to arrangement of pins vertically moving for a contact skin face, an effect of stimulus according to a jet force or sucking force of air through a jet hole or a sucking hole, an effect of stimulus of rubbing the skin, an effect of stimulus according to a contact of an electrode, an effect of stimulus using an electrostatic force and an effect according to a reproduction of cold and warmth using an element capable of absorbing or radiating heat in addition to vibrations.

The haptic module 154 can not only transmit haptic effects through direct contact, but also allow the user to feel haptic effects through kinesthetic sense of his or her fingers or arms. The mobile terminal 100 can also include at least two haptic modules 154 according to a constitution of the mobile terminal.

Further, the memory 160 can store a program for the operation of the controller 180 and temporarily store input/output data (for example, a phone book, messages, still images, moving images, etc.). The memory 160 can store data about vibrations and sounds in various patterns, which are output from when a touch input is applied to the touch screen.

The memory 160 can also include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

In addition, the interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 also controls the overall operation of the mobile terminal. For example, the controller 180 performs control and processing for voice communication, data communication and video telephony. The controller 180 can also include a multimedia module 181 for playing multimedia. The multimedia module 181 can be included in the controller 180 or be separated from the controller 180. The controller 180 can also perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some instances, the embodiments can be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
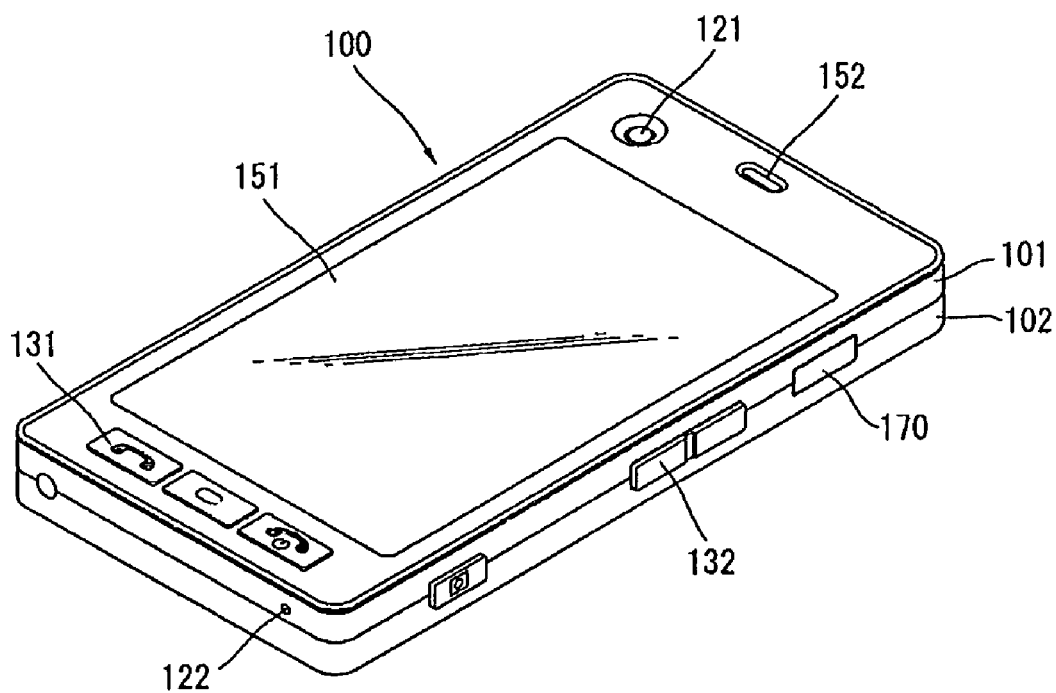
FIG. 2A is a front perspective view of the mobile terminal according to an embodiment of the present invention.

Next, FIG. 2A is a front perspective view of a mobile terminal or a handheld terminal 100 according to an embodiment of the present invention. In this example, the handheld terminal 100 has a bar type terminal body. However, the present invention is not limited to a bar type terminal and can be applied to terminals of various types including a slide type, folder type, swing type and swivel type terminals having at least two bodies that are relatively movably combined.

The terminal body includes a case (a casing, a housing, a cover, etc.) forming the exterior of the terminal 100. In the present embodiment, the case is divided into a front case 101 and a rear case 102. Various electronic components are arranged in the space formed between the front case 101 and the rear case 102. At least one middle case can also be additionally arranged between the front case 101 and the rear case 102. Further, the cases can be formed of plastics through injection molding or made of a metal material such as stainless steel (STS) or titanium (Ti).

The display unit 151, the audio output unit 152, the camera 121, user input units 131 and 132, the microphone 122 and the interface 170 can be arranged in the terminal body, specifically, in the front case 101. Also, the display unit 151 occupies most of the main face of the front case 101. The audio output unit 152 and the camera 121 are arranged in a region in proximity to one of both ends of the display unit 151, and the user input unit 131 and the microphone 122 are located in a region in proximity to the other end of the display unit 151. The user input unit 132 and the interface 170 are also arranged on the sides of the front case 101 and the rear case 102.

In addition, the user input unit 130 is operated to receive commands for controlling the operation of the handheld terminal 100 and in this example includes input units 131 and 132. The input units 131 and 132 can be referred to as manipulating portions and employ any tactile manner in which a user operates the input units 131 and 132 while having tactile feeling.

The input units 131 and 132 can receive various inputs. For example, the first input unit 131 receives commands such as a start, end and scroll commands and the second input unit 132 receives commands such as a volume control command for controlling the volume output the audio output unit 152 or a conversion command for converting the display unit 151 to a touch recognition mode.

Figure 2B:
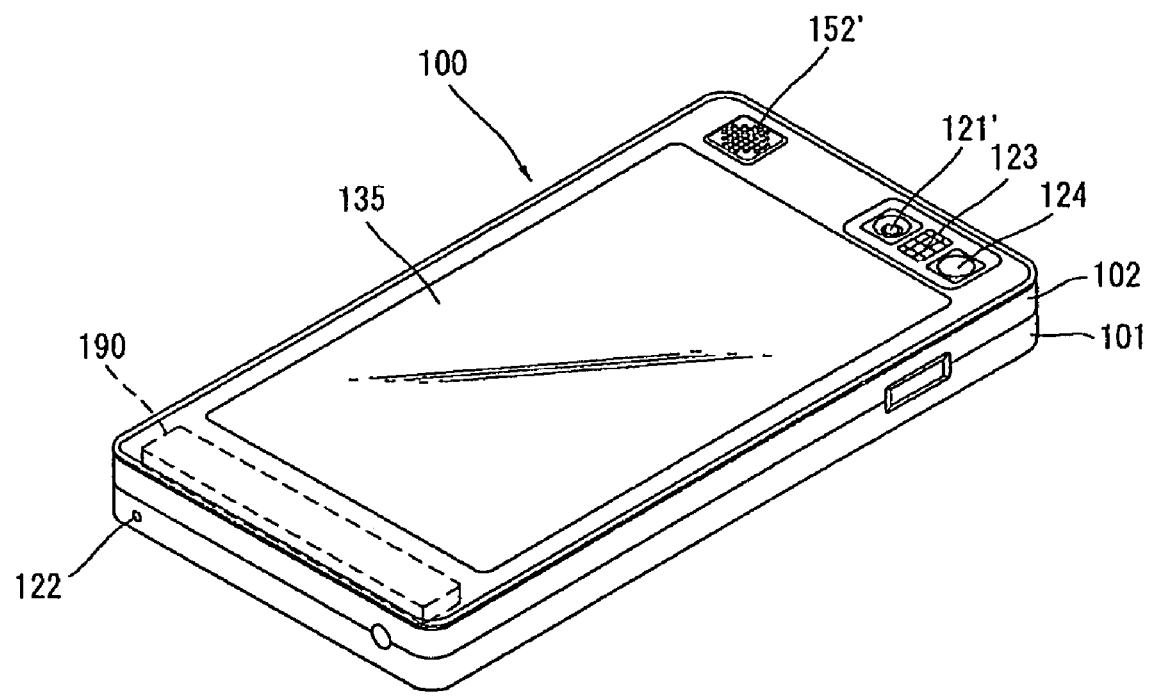
FIG. 2B is a rear perspective view of the mobile terminal according to an embodiment of the present invention.

Next, FIG. 2B is a rear perspective view of the handheld terminal shown in FIG. 2A according to an embodiment of the present invention. Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, the camera 121 preferably has low pixels such that it can capture an image of the face of a user and transmit the image to a receiving part during video telephony, while the camera 121' has high pixels because it captures an image of a general object and does not immediately transmit the image in many situations. The cameras 121 and 121' can also be attached to the terminal body such that they can be rotated or popped-up.

Further, a flash bulb 123 and a mirror 124 are additionally arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'.

An audio output unit 152' can be additionally provided on the rear side of the terminal body. Thus, the audio output unit 152' can achieve a stereo function with the audio output unit 152 shown in FIG. 2A and be used for a speaker phone mode when the terminal is used for a telephone call.

A broadcasting signal receiving antenna can also be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

Further, the power supply 190 for providing power to the handheld terminal 100 is set in the terminal body. The power supply 190 can be included in the terminal body or detachably attached to the terminal body.

As shown, a touch pad 135 for sensing touch can be additionally attached to the rear case 102. The touch pad 135 can be of a light transmission type as the display unit 151. In this instance, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

Further, the touch pad 135 operates in connection with the display unit 151 of the front case 101. The touch pad 135 can be located in parallel with the display unit 151 and behind the display unit 151. The touch panel 135 can also be identical to or smaller than the display unit 151 in size.

Figure 2C:
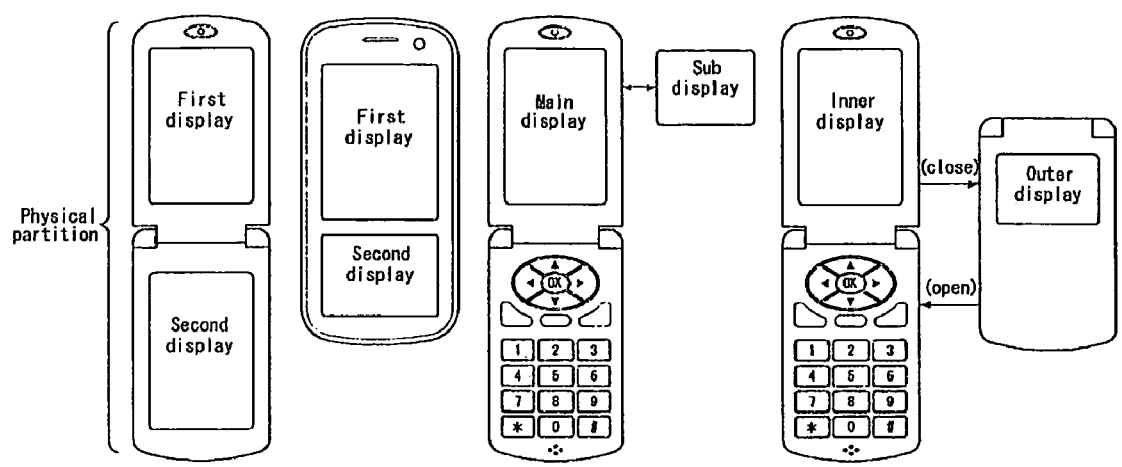
FIGS. 2C and 2D are overviews of the mobile terminal and display screens according to various embodiments of the present invention.
Figure 2D:
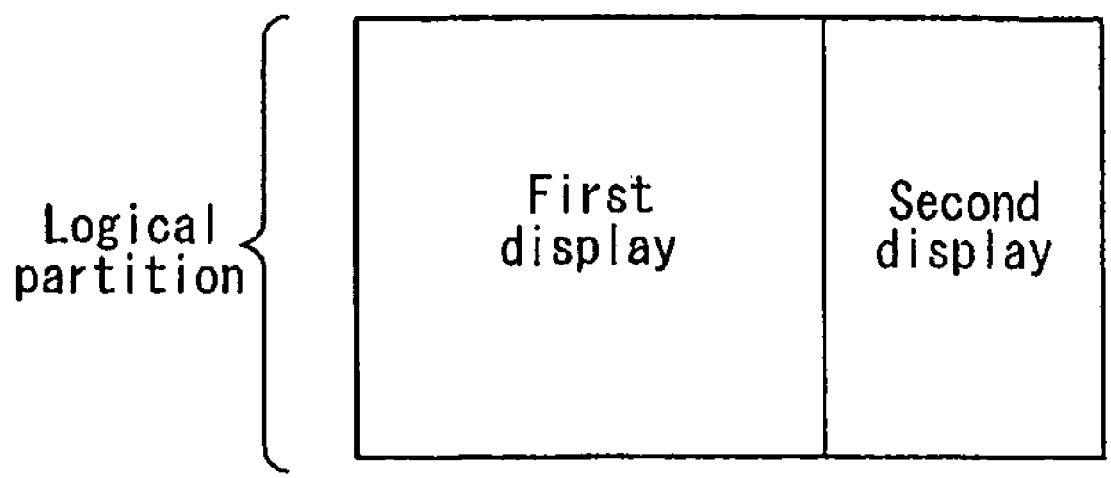

Next, FIGS. 2C and 2D illustrate the mobile terminal 100 and the display unit 151 according to various embodiments of the present invention. Referring to FIG. 2C, the display unit can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body.

The sub display is separated from the mobile terminal and detachably combined with the mobile terminal body through an interface to display data from the mobile terminal 100. The display unit can also include first and second displays which are logically separated from each other in a display panel, as illustrated in FIG. 2D.

Figure 3:
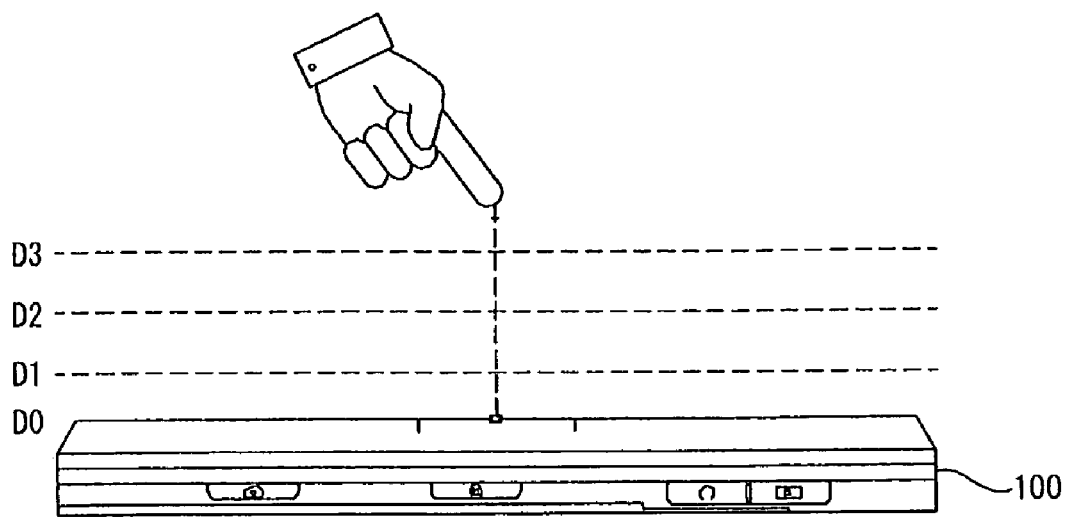
FIG. 3 is a conceptional view for explaining a proximity depth of a proximity sensor.

Next, FIG. 3 is a conceptional view for explaining a proximity depth of the proximity sensor. As shown in FIG. 3, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

In addition, the distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can also be arranged in the touch screen.

In particular, when the pointer completely comes into contact with the touch screen (D0), this action is recognized as contact touch. When the pointer is located within a distance D1 from the touch screen, this action is recognized as proximity touch of a first proximity depth. Also, when the pointer is located in a range between the distance D1 and a distance D2 from the touch screen, this action is recognized as proximity touch of a second proximity depth.

In addition, when the pointer is located in a range between the distance D2 and a distance D3 from the touch screen, this action is recognized as proximity touch of a third proximity depth, and when the pointer is located at longer than the distance D3 from the touch screen, this action is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
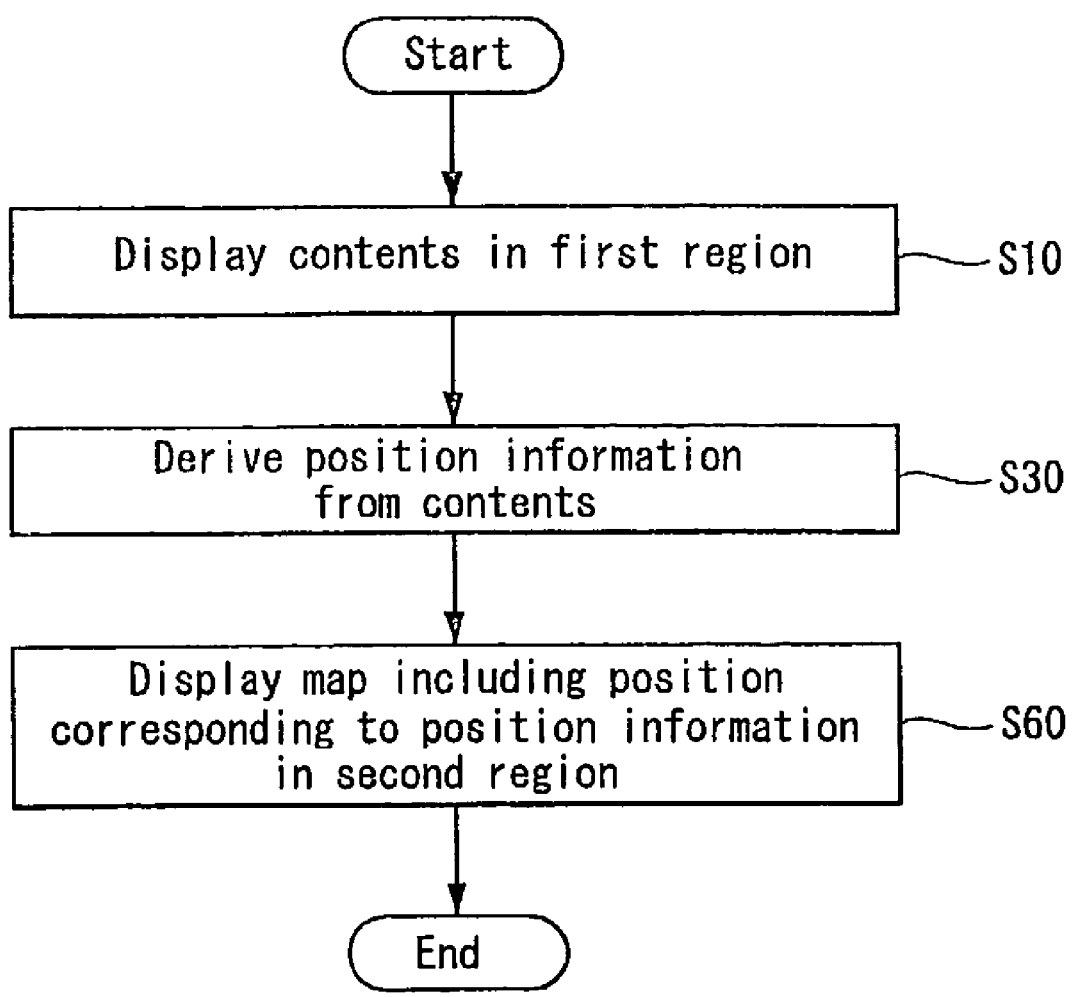
FIG. 4 is a flow chart illustrating a method of displaying a position on a map according to a first embodiment of the present invention.
Figure 5A:
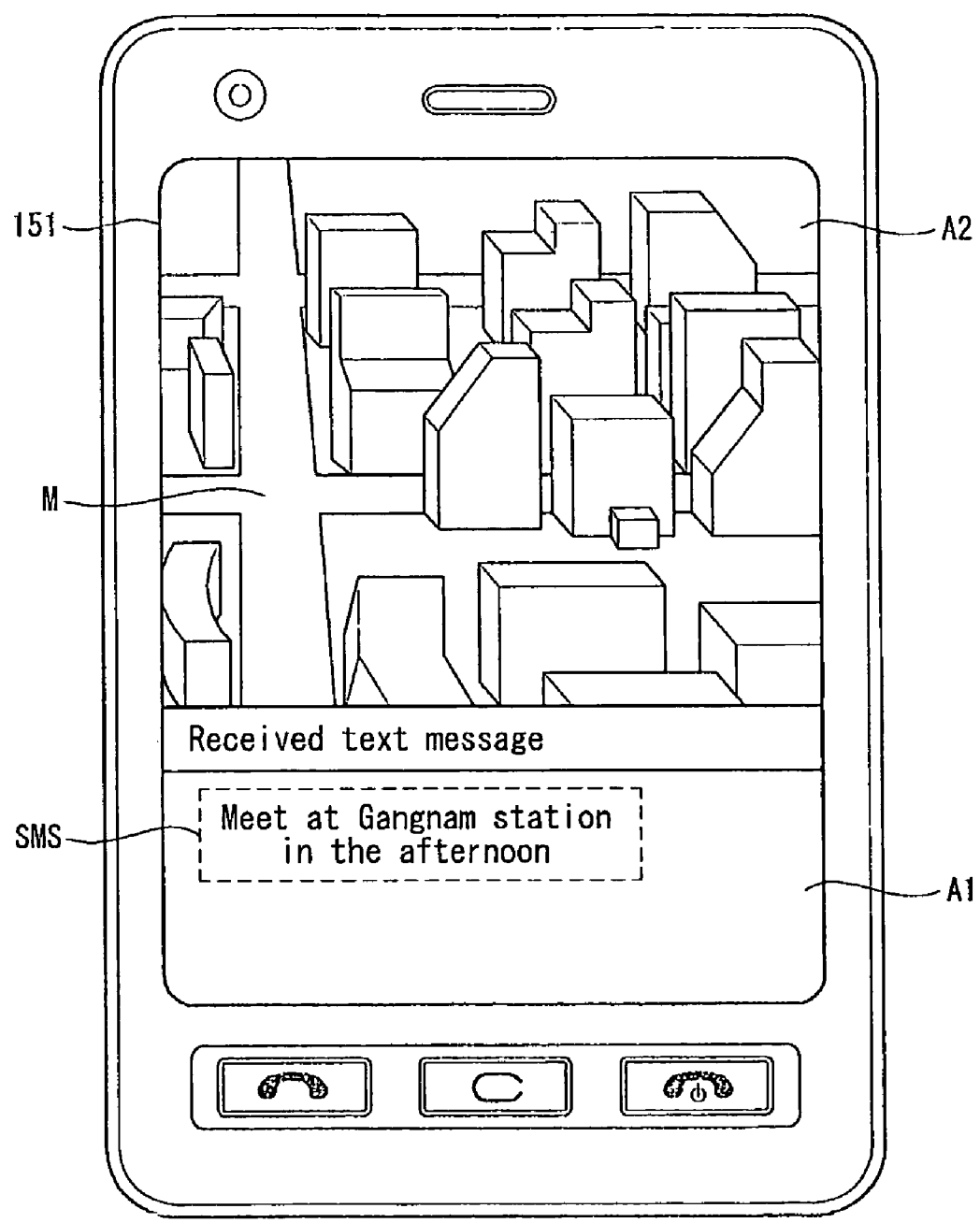
FIGS. 5A, 5B and 5C are overviews of display screens illustrating images displayed according to the method of FIG. 4.
Figure 5B:
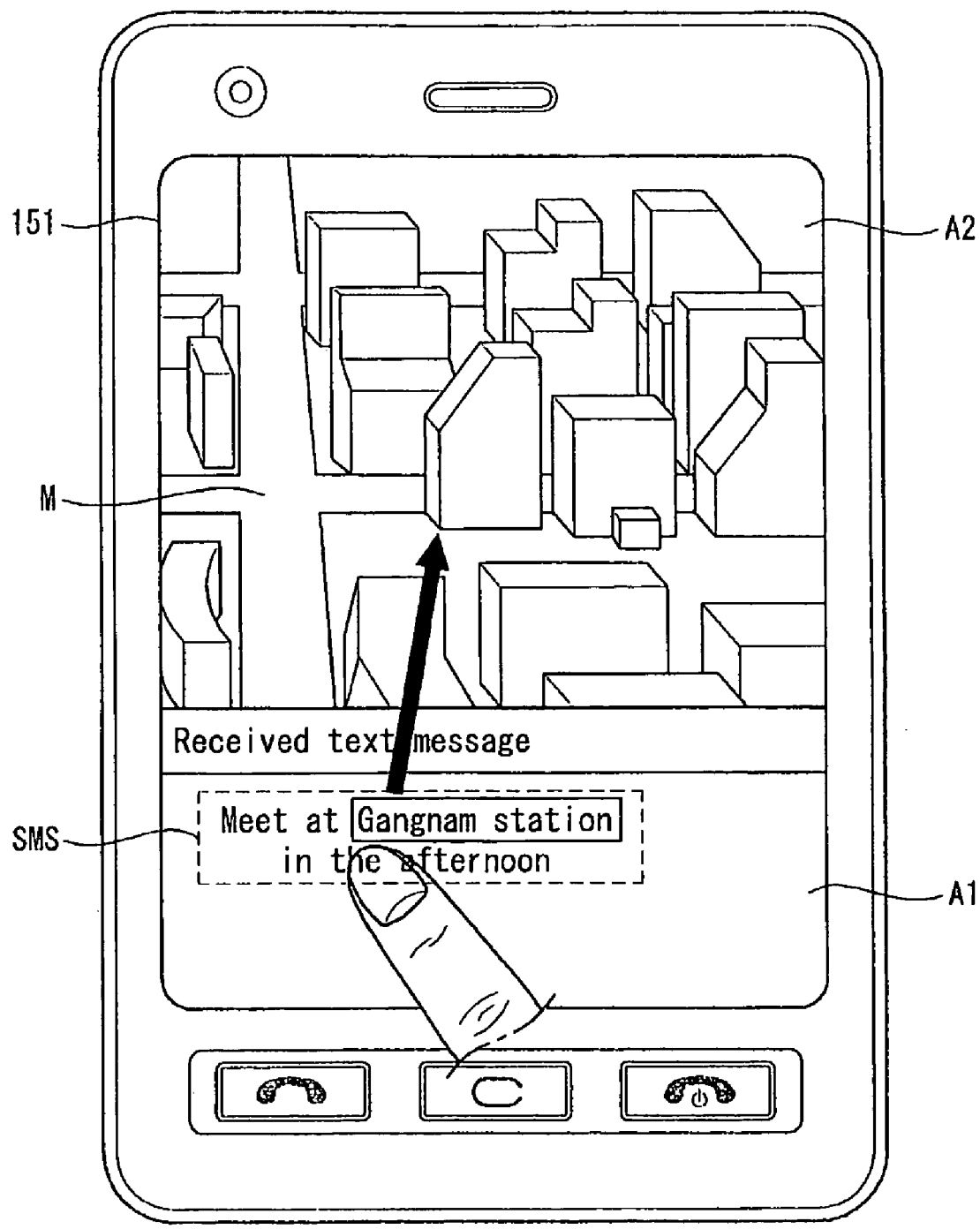
Figure 5C:
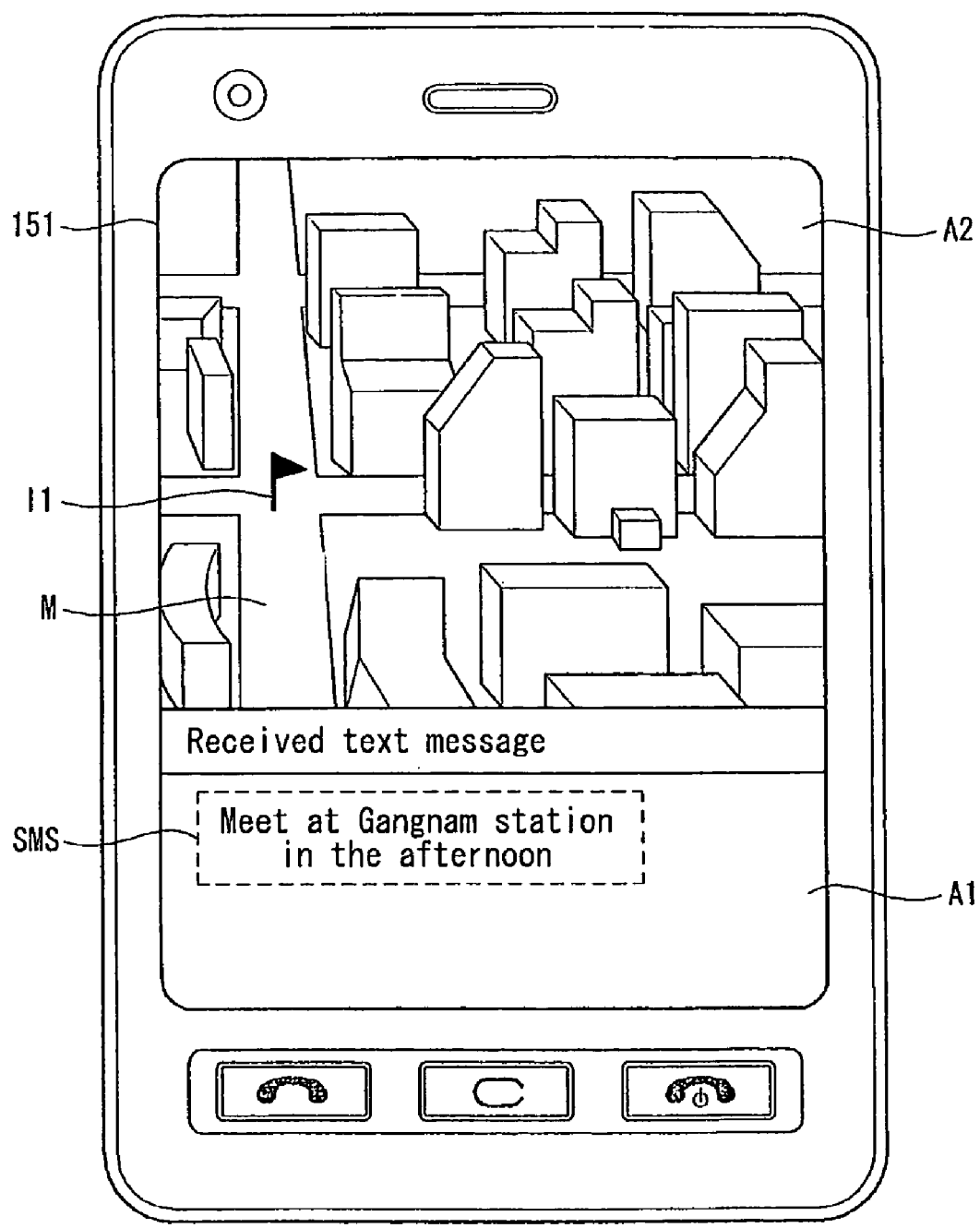

Next, FIG. 4 is a flow chart illustrating a method of displaying a position on a map according to a first embodiment of the present invention, and FIGS. 5A, 5B and 5C are overviews of display screens illustrating images displayed on the display unit 151 of the mobile terminal 100 according to the method of displaying a position on a map illustrated in FIG. 4.

Referring to FIG. 4, the method of displaying a position on a map of the mobile terminal 100 includes displaying contents in a first region A1 (S10). The contents include data and programs that can be processed by the mobile terminal. For example, the contents can include data or programs stored in the memory 160 and text messages, e-books, chatting contents, web documents, still images and moving images received by the mobile terminal 100.

Further, as shown in FIGS. 5A-5C, the display unit 151 having a first region A1 and a second region A2 can include at least two displays which are physically or logically separated from each other. For example, the displays can be arranged at a distance from each other on one side of the mobile terminal 100 or respectively arranged on different sides of the mobile terminal 100.

The touch screen can also be constructed in such a manner that a touch sensor is mounted on the display unit 151 or included in the display unit 151. Accordingly, the display unit 151 including the touch sensor can be used as an input device receiving a user input as well as an image output device.

In addition, when the contents are displayed in the first region A1, the method includes deriving position information from the contents displayed in the first region A1 (S30). The position information can be included in the contents or in a program or data related to the contents. For example, when the contents correspond to text, place names, place addresses and building names become the position information included in the contents. When the contents correspond to a moving image, the position information such as the name of a place can be included in a file that stores caption data displayed on the moving image.

Further, the contents and position information can be of different types. That is, when the contents are a photo, the contents correspond to an image. However, if a header representing information on the photo includes the place where the photo is captured, the position information corresponds to text.

When the position information is derived from the contents, the method includes displaying a map M including a position corresponding to the position information in the second region A2 (S60). That is, if the position corresponding to the position information derived from the contents exists, the position on the map M can be displayed in the second region A2. Thus, the user can be intuitively aware of the position, because the position is displayed on the map M based on the position information included in the contents.

Next, referring to FIG. 5A, the first region A1 displays a received text-based SMS message. The SMS message can include position information on a specific area such as 'Gangnam station', which is a metro station in Seoul, Korea. Then, referring to FIG. 5B, the user touches the position information 'Gangnam station', and then drags the touched position information to a point in the second region A2.

Thus, referring to FIG. 5C, when user drops the position information on the second region A2, the display unit 151 displays a first identification icon I1 on a point of the map M, which corresponds to the position information 'Gangnam station'. Accordingly, the user can easily see information about the station such as the location of 'Gangnam station'.

Figure 6:
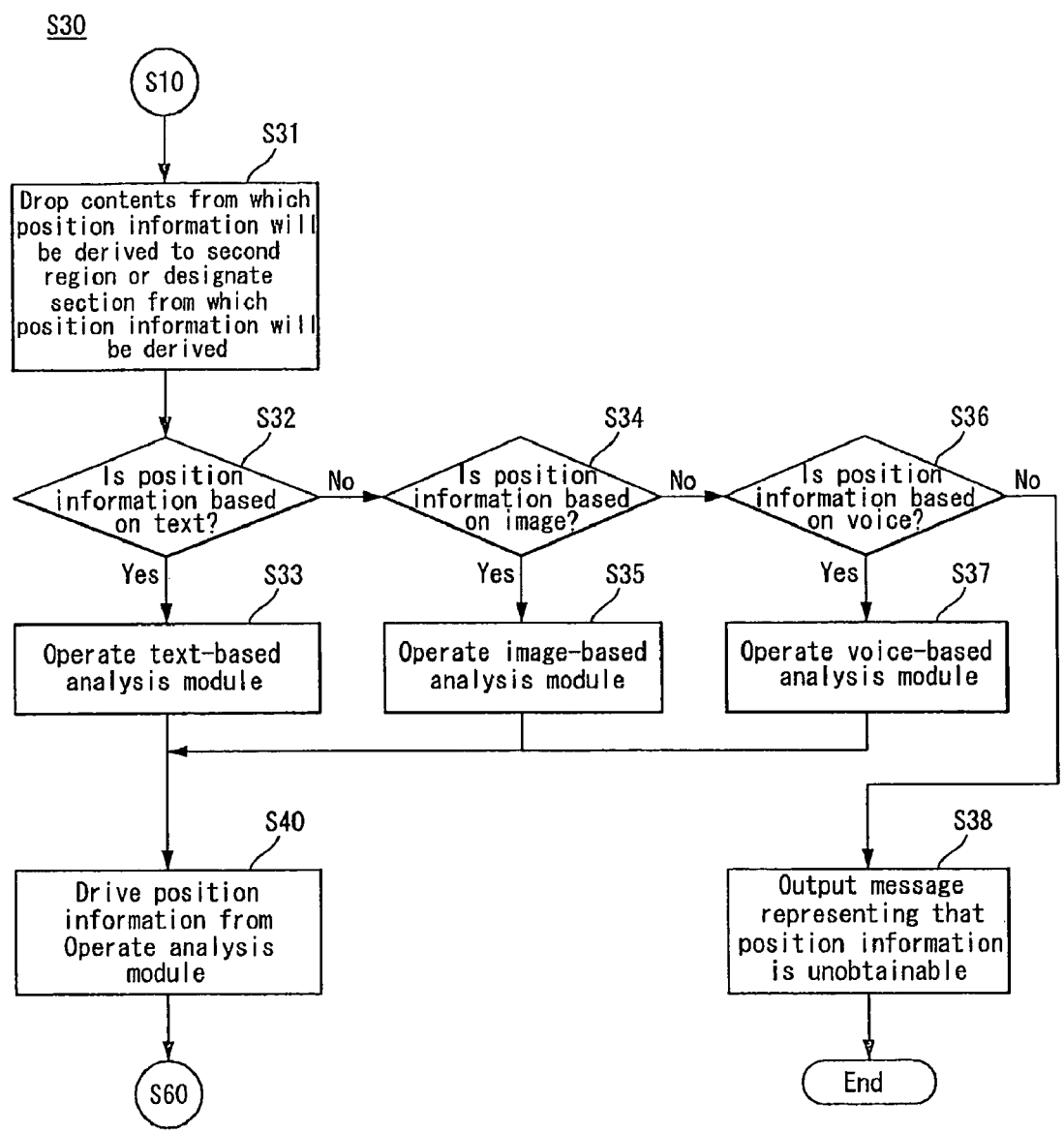
FIG. 6 is a flow chart illustrating a method of deriving position information from contents in the method illustrated in FIG. 4.
Figure 7B:
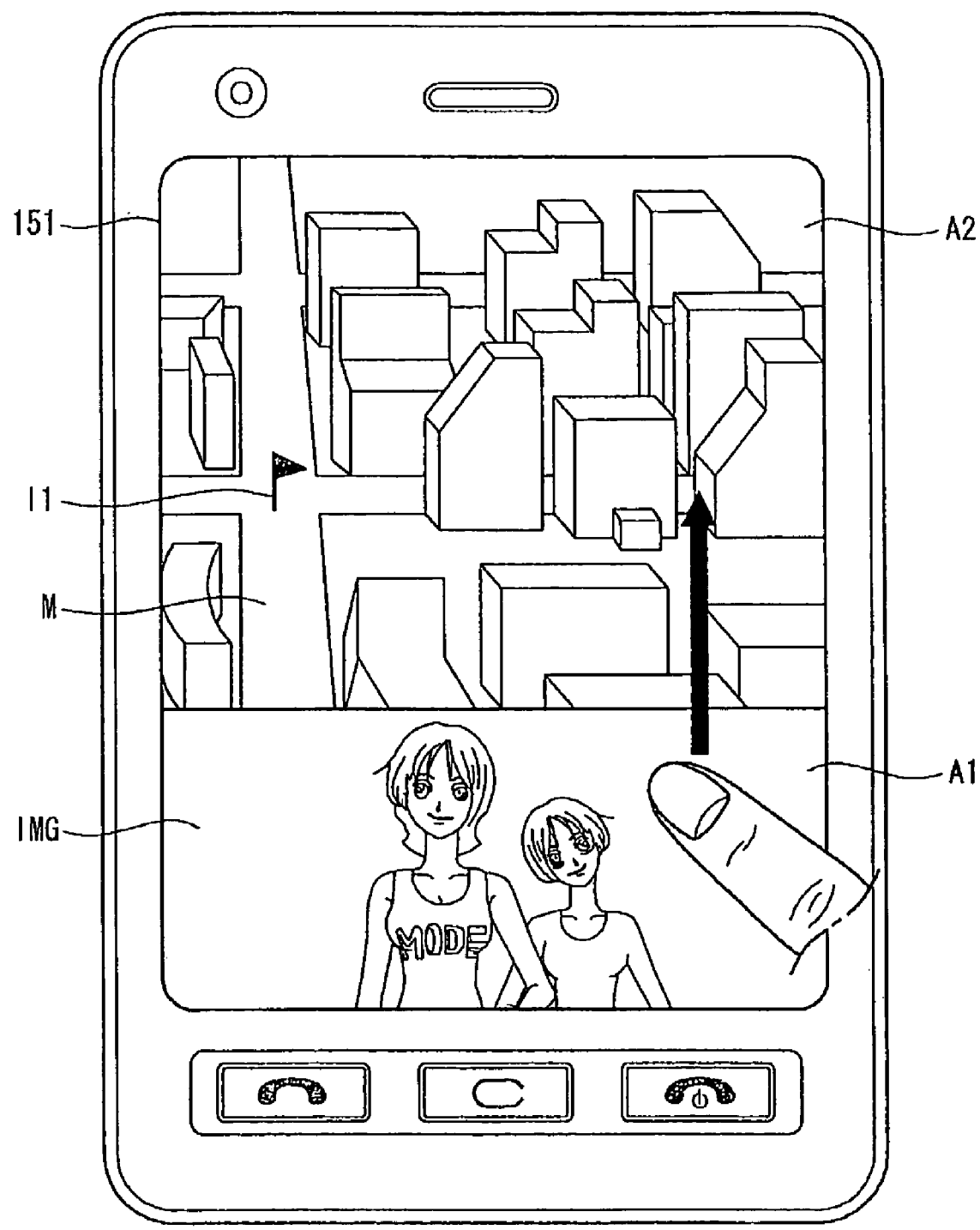
FIGS. 7B and 7C are overviews of display screens illustrating images displayed according to the method illustrated in FIG. 6.
Figure 7C:
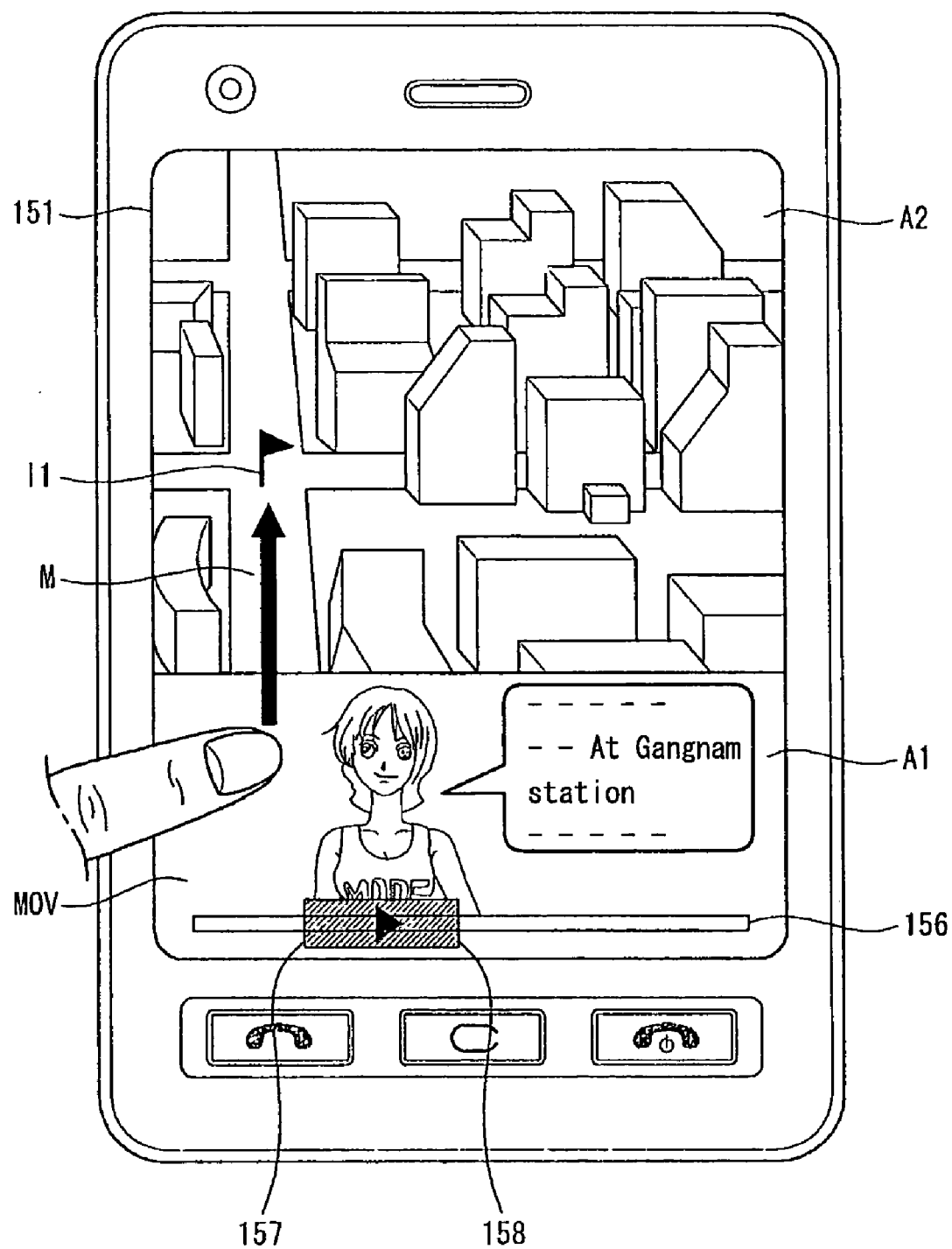

Next, FIG. 6 is a flow chart illustrating a method of deriving the position information from the contents in FIG. 4, FIG. 7A is an overview of a header of an image, and FIGS. 7B and 7C are overviews of display screens illustrating images displayed according to the method in FIG. 6. That is, FIGS. 6, 7A, 7B and 7C illustrate the method of deriving position information from contents (S30 in FIG. 4) in more detail.

Referring to FIG. 6, the user drops the contents from which position information will be derived to the second region or designates a section (S31). In addition, there are various types of contents including position information, and thus the method of deriving the position information depends on the type of contents.

When the contents correspond to a text message, an e-book or a moving image, a portion including position information can be selected through a touch-and-drag operation to specify a section from which the position information will be derived, as explained above with reference to FIGS. 5A, 5B and 5C.

Also, when the contents correspond to an image such as a photo, an object from which position information will be derived can be specified through a method of touching and dragging the photo displayed in the first region A1 to the second region A2. Similarly, when the contents correspond to a moving image, a section of the moving image, which includes position information, can be designated by a touch-and drag operation to specify the section from which the position information will be derived.

Next, in FIG. 6, the method includes determining whether the position information is based on text (S32), and the controller 180 operates a text-based analysis module when the position information is based on text (S33). In addition, text-based position information indicates that the position information can be recognized as characters even without having an additional conversion process. In this instance, the position information recognizable as characters can be derived through the text-based analysis module.

Also, the method determines whether the position information is based on an image (S34), and the controller 180 operates an image-based analysis module when the position information is based on an image (S35). Further, image-based position information indicates that characters are displayed as an image on a photo or an image. In this instance, the image characters can be converted into a text through an optical character reader (OCR), for example. The technical contents related to the OCR are well-known in the art so that a detailed explanation thereof is omitted.

The method also includes determining whether the position information is based on a voice (S36), and the controller 180 operates a voice-based analysis module when the position information is based on a voice (S37). Further, voice-based position information indicates the position information is included in the form of a voice in a moving image. In this instance, the position information is derived using a speech recognition technique. The speech recognition technique analyzes the frequency of a voice wave and grasps the meaning of the voice through the pattern of the analyzed frequency. The recognized position information can then be represented as a text.

Also, when the position information is not included in the contents or can not be obtained, the controller displays a message which represents that the position information cannot be derived (S38). Further, the controller 180 operates the analysis modules for text, an image and a voice to obtain the position information (S40). The operation corresponding to the contents being text has been explained above with reference to FIGS. 5A, 5B and 5C. Therefore, the operations for the contents corresponding to an image or a voice are described below.

In more detail, an image IMG such as a photo can include header information. As illustrated in FIG. 7A, the header information can include the size of the image IMG, the date when the image IMG is photographed and the place where the image IMG is photographed. Further, the information on the place can be acquired through a global position system (GPS) device included in a photographing apparatus and recorded. The information on the place can also be personally input by the user. Although FIG. 7A illustrates that the place where the image is photographed is displayed as characters, the place can be represented by latitude and longitude coordinates when the GPS device is used. In this instance, a position corresponding to the latitude and longitude can be displayed on the map M.

Referring to FIG. 7B, when the image IMG is displayed in the first region A1, the user can connect the image IMG to the second region A2 in which the map M is displayed through a touch- and drop operation to display the position corresponding to the position information included in the image IMG on the map M.

That is, when the user touches and drops the image IMG to the map M, the controller 180 operates the corresponding analysis module to derive the position information included in the image IMG. Then, when the position information is acquired, the display unit 151 displays the first identification icon I1 at the corresponding position on the map M.

Also, when the map M is not displayed in the second region A2 or the image IMG is displayed on all of the display unit 151, the controller 180 can control the display unit 151 to display a menu such as 'connect to map' or an icon for connecting to the map at a predetermined position of the image IMG. In this instance, when the user touches the image IMG, drags and drops the image IMG to the icon for connecting to the map, the controller 180 can control the display unit 151 to displays the map M in the second region A2.

Next, referring to FIG. 7C, the contents in the region A1 can also be a moving image MOV. In this instance, the user can designate a section from which position information will be derived through a progress bar 156 which indicates the quantity of a played portion of the moving image MOV and the current position of the played moving image IMG. Further, the section from which the position information will be derived can be designated in such a manner that the user touches a start point 157 and drops the touch point to an end point 158, the user touches the start point 157 and the end point 158 a short interval (e.g., a double touch operation), or the start point 157 and the end point 158 are sequentially touched at an interval longer than the interval of the double touch.

When the section is designated (e.g., when the first region A1 including the moving image MOV is touched and dropped to the second region A2 including the map M) to connect the moving image MOV to the map M, the controller 180 controls the display unit 151 to display a map including a position corresponding to the position information included in the moving image MOV.

Further, when the section is designated and the moving image MOV is connected to the map M, the position information included in the section can be derived through speech recognition. That is, when a speaker in the moving image MOV says "Gangnam station," the position information "Gangnam station" is acquired, the map M including "Gangnam station" is displayed, and the first identification icon I1 is indicated on the position of "Gangnam station" on the map M.

Further, although the contents correspond to the moving image MOV, the position information included in the moving MOV can be text. That is, when the moving image MOV includes a caption file, a caption included in the caption file is information in a text form. Accordingly, when a section of the moving image MOV is designated, a caption file corresponding to the section can be searched to derive the position information.

Figure 8:
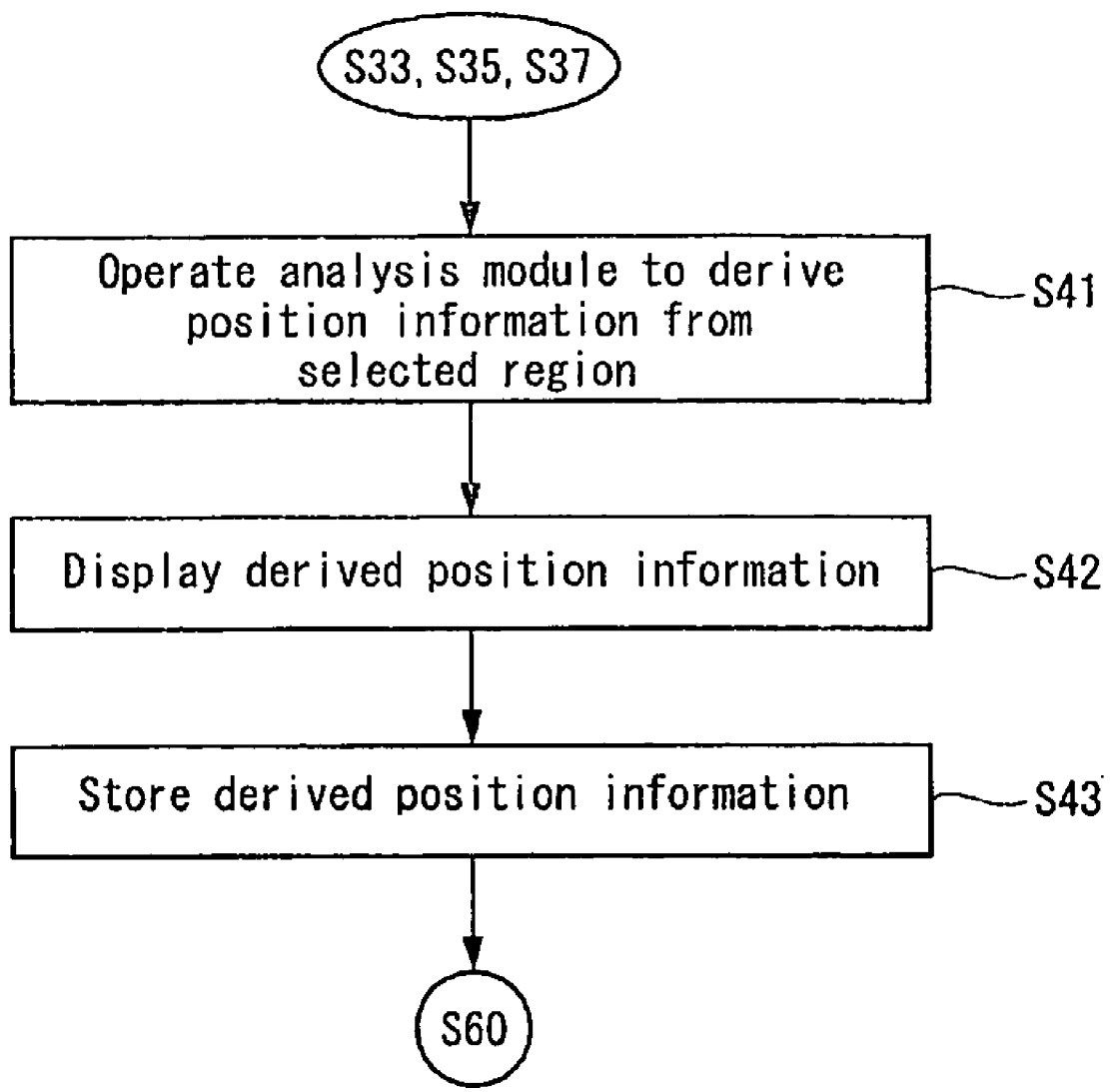
FIG. 8 is a flow chart illustrating a method of deriving position information from a selected region and storing the position information when deriving position information from contents illustrated in FIG. 6.

Next, FIG. 8 is a flow chart illustrating the method of deriving position information from a selected region and storing the position information in the process illustrated in FIG. 6, and FIGS. 9A, 9B and 9C are overviews of display screens illustrating images displayed according to the method in FIG. 8.

Referring to FIG. 8, a corresponding analysis module is operated to derive position information from a selected region (S41). Further, the controller 180 can display the derived position information to confirm whether the position information is correct or so the user can select one of a plurality of position information items when the plurality of position information items are derived (S42).

When the derived position information is correct, the position information is stored (S43). Further, while the derived position information can be used only once and deleted, the position information can also be stored in a database and used to acquire position information rapidly and correctly in the future.

Figure 9A:
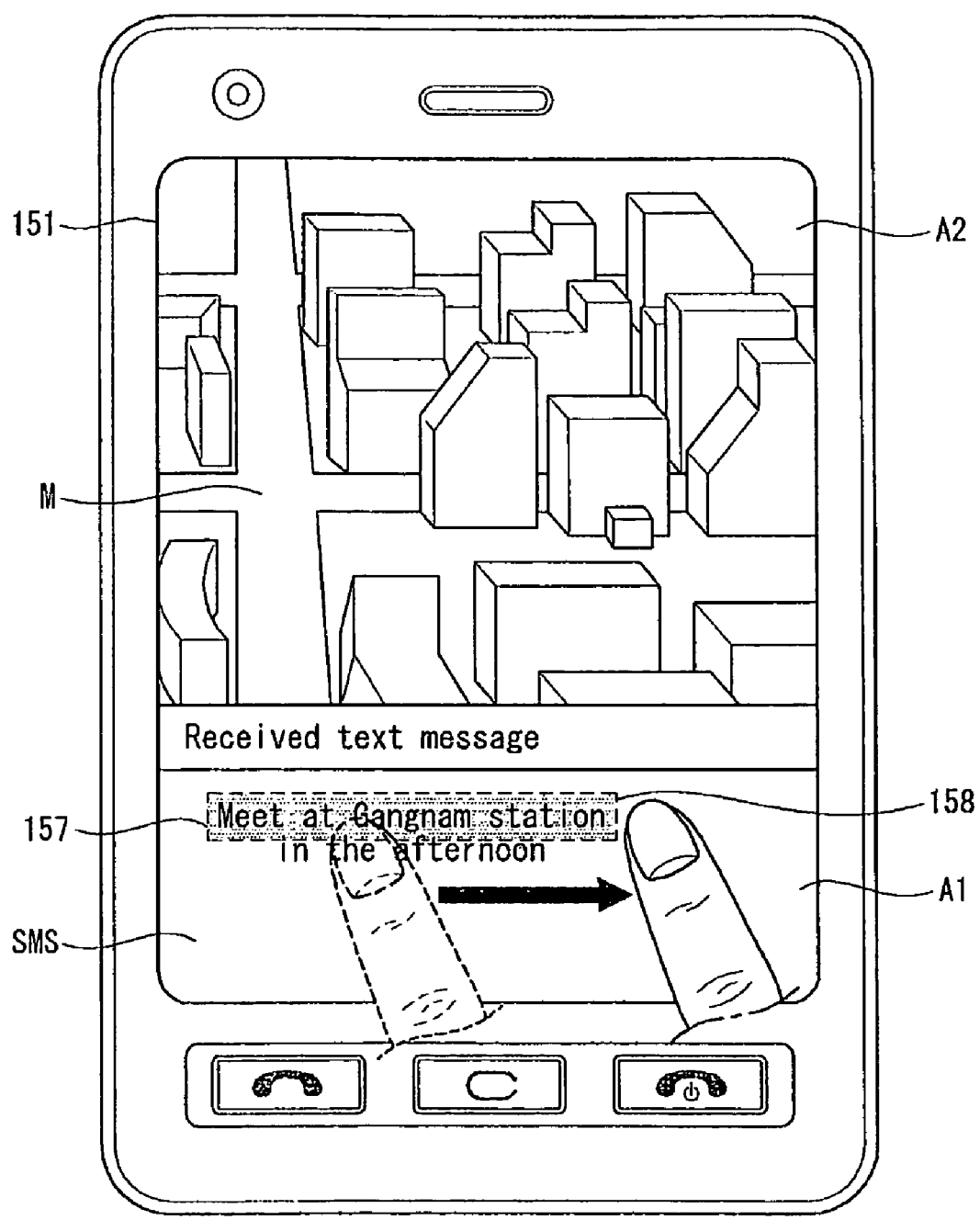
FIGS. 9A, 9B and 9C are overviews of display screens illustrating images displayed according to the method illustrated in FIG. 8.

Referring to FIG. 9A, in the received SMS text message displayed in the first region A1, the user can designate a section between the start point 157 and the end point 158 of the sentence through a touch-and-drag operation. When the map M is not displayed and the SMS text message is displayed on the entire display 151, as described above, a map including a position corresponding to the position information can be displayed through a menu or an additional icon.

Figure 9B:
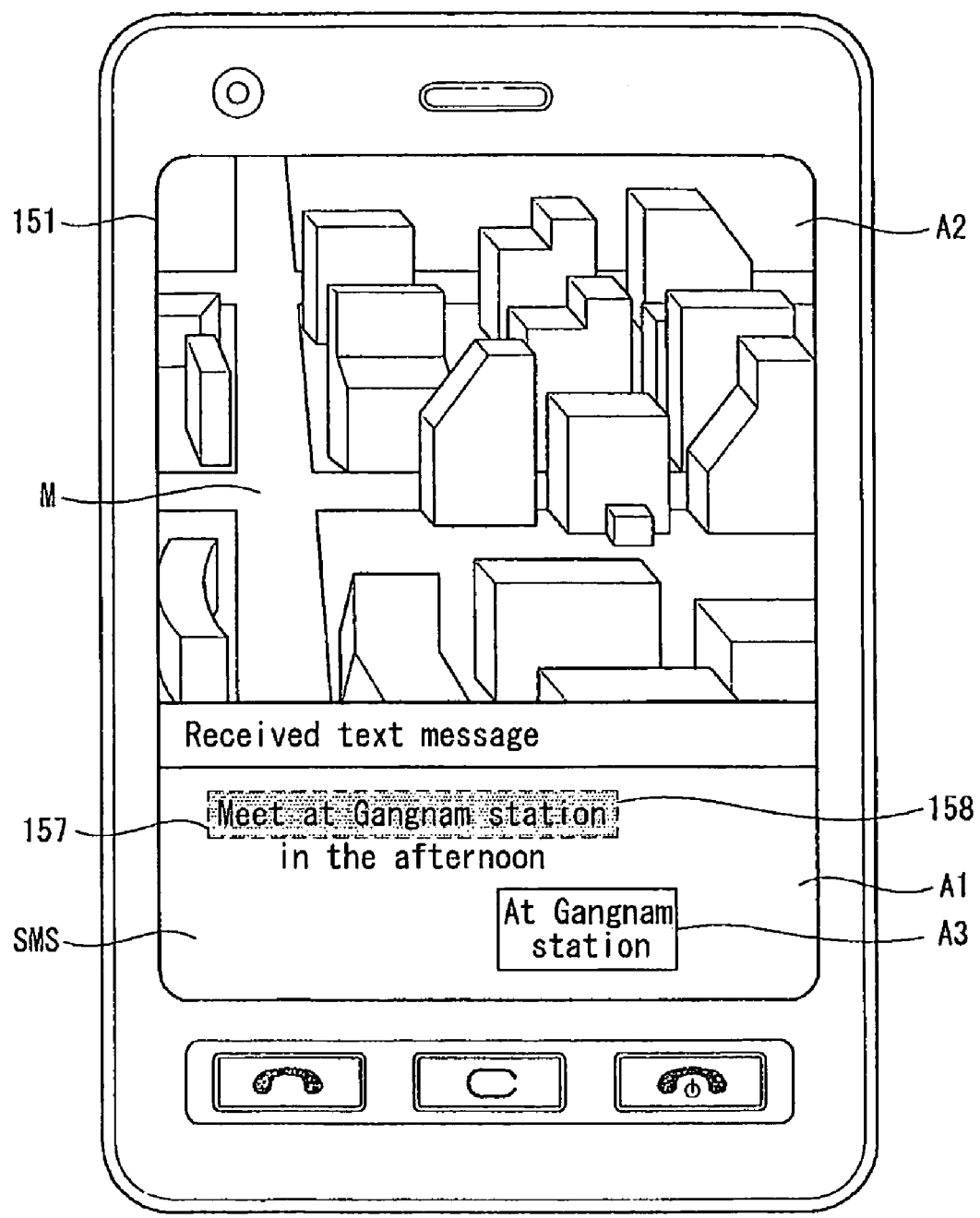

In addition, when the section from which position information will be derived is designated, the analysis module is operated to derive the position information included in the section. Referring to FIG. 9B, the controller 180 can display the position information derived from the section in a third region A3. In more detail, in the received text message "meet at Gangnam station", "Gangnam station" can be considered as position information.

Further, the controller 180 can display the third region A3 as an additional display region distinguished from the first and second regions A1 and A2 or superimpose the third region A3 on the first and second regions A1 and A2. Thus, when the derived position information is displayed in the third region A3, the user can confirm whether the analysis module is correctly operated.

Figure 9C:
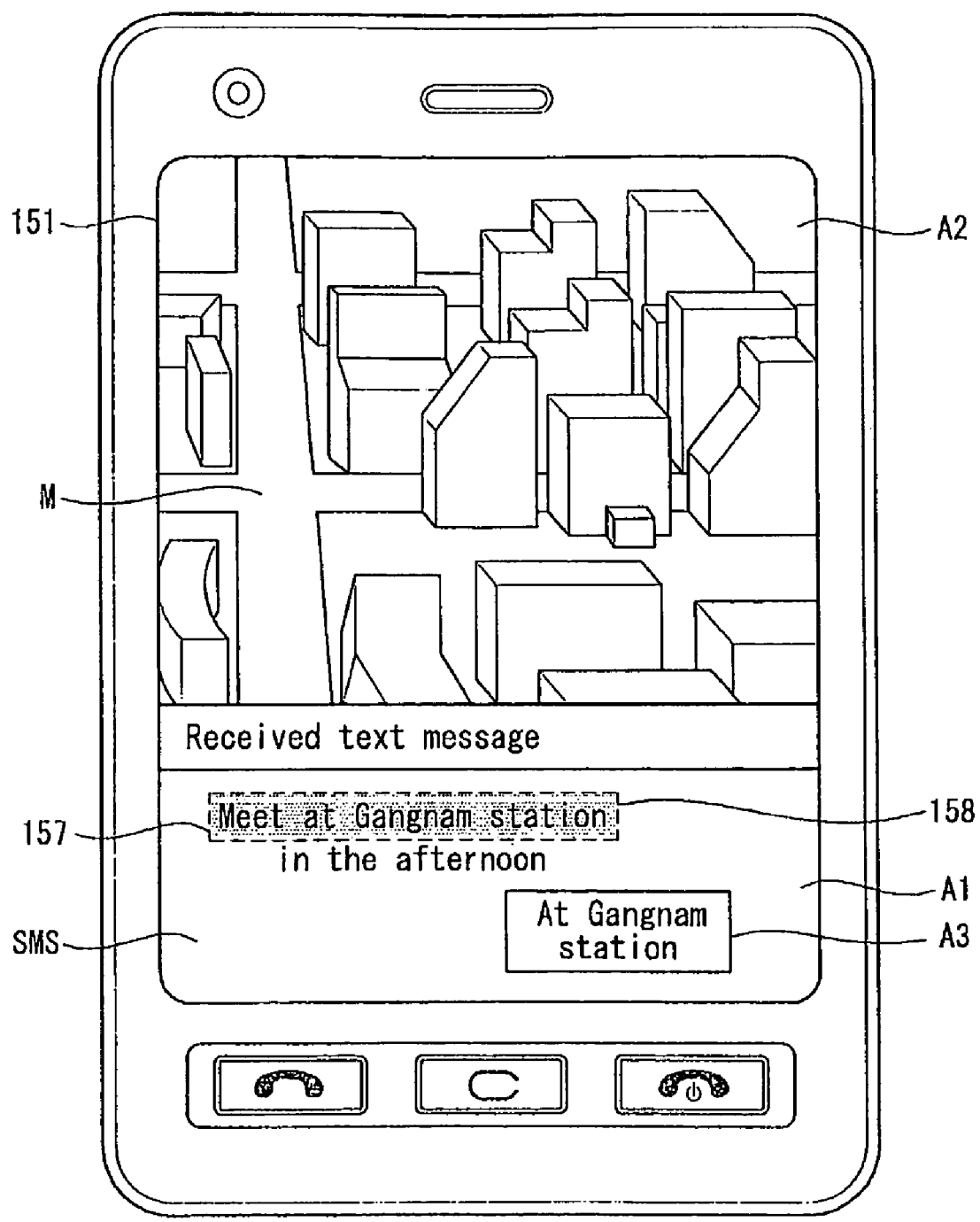

Referring to FIG. 9C, the controller 180 can display a phrase including the position information in the third region A3. Furthermore, when the section designated by the start point 157 and the end point 158 includes several sentences, the controller 180 can display a sentence including the position information in the third region A3.

In addition, while FIGS. 9A, 9B and 9C illustrate the controller 180 displaying the derived position information in the additional third region A3, the controller 180 can also highlight a portion of the text message corresponding to the position information.

Figure 10:
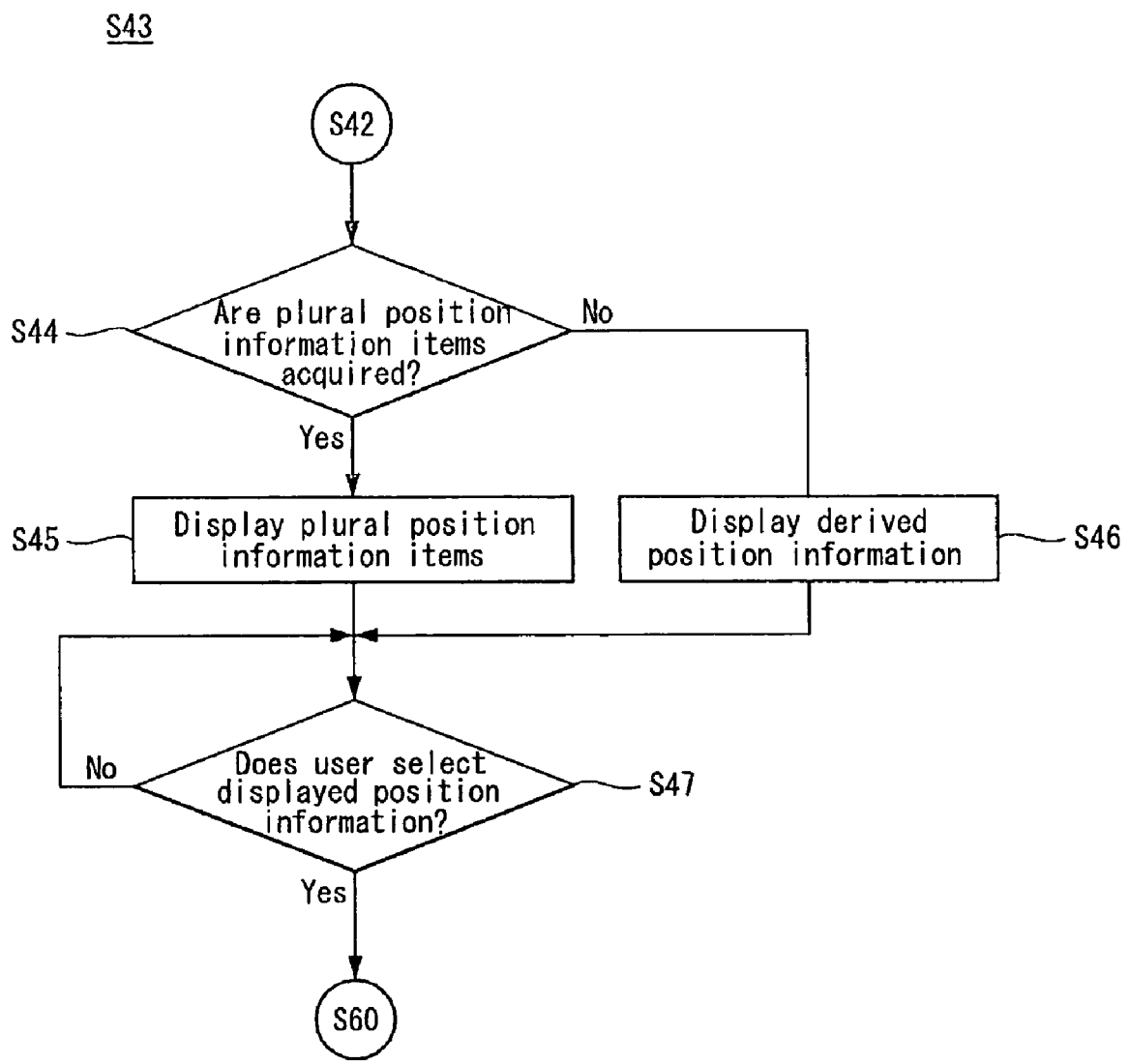
FIG. 10 is a flow chart illustrating a method of displaying acquired position information in the method illustrated in FIG. 8.
Figure 11:
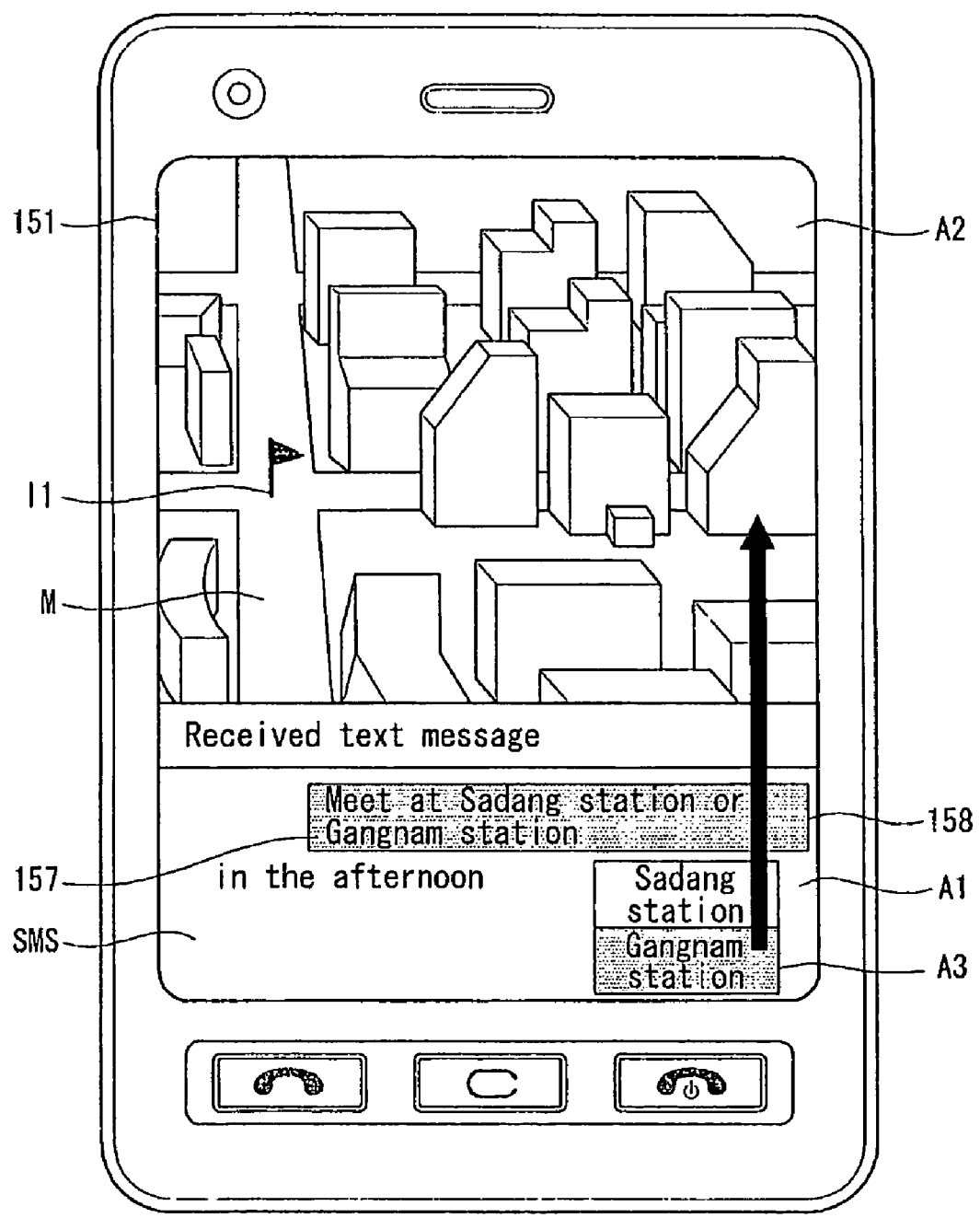
FIG. 11 is an overview of a display screen illustrating an image displayed according to the method illustrated in FIG. 10.

Next, FIG. 10 is a flow chart illustrating a method of displaying the derived position information in the method of FIG. 8, and FIG. 11 is an overview of a display screen illustrating an image displayed according to the process of FIG. 10.

Referring to FIG. 10, the controller 180 determines whether a plurality of position information items are derived (S44). For example, as shown in FIG. 11, the section designated by the start point 157 and the end point 158 include a plurality of position information items. The controller 180 also displays the plurality of position information items (S45), when the controller 180 determines that a plurality of position information items are derived (Yes in S44). When a single position information item is derived (No in S44), the controller 180 displays the derived position information (S46).

After the user confirms the displayed position information, the user can select the displayed position information (S47). That is, when the plurality of position information items are derived, the user can select one of the position information items. In addition, even though a single position information item is derived, the user can confirm whether the derived position information is correct and then select the position information to prevent the mobile terminal 100 from performing a wrong operation.

Referring to FIG. 11, the section between the start point 157 and the end point 158 includes two position information items "Sadang station" and "Gangnam station," which are metro stations in Seoul, Korea. The controller 180 also displays both "Sadang station" and "Gangnam station" in the third region A3.

The user can then select "Gangnam station," for example, and drops the selected position information on the map M such that an area including "Gangnam station" is displayed on the map M and the first identification icon I1 is indicated on the location of "Gangnam station." The user can also select the displayed plurality of position information items.

That is, the user can select "Sadang station" and "Gangnam station" simultaneously or sequentially and drop them on the map M. In this instance, the controller 180 can automatically adjust a scale of the map M such that both of the two areas are displayed on the display unit 151. Furthermore, the controller 180 can also display one of the two areas on the map M and allow the user to move the map M or adjusts the scale to view the other area.

Figure 12:
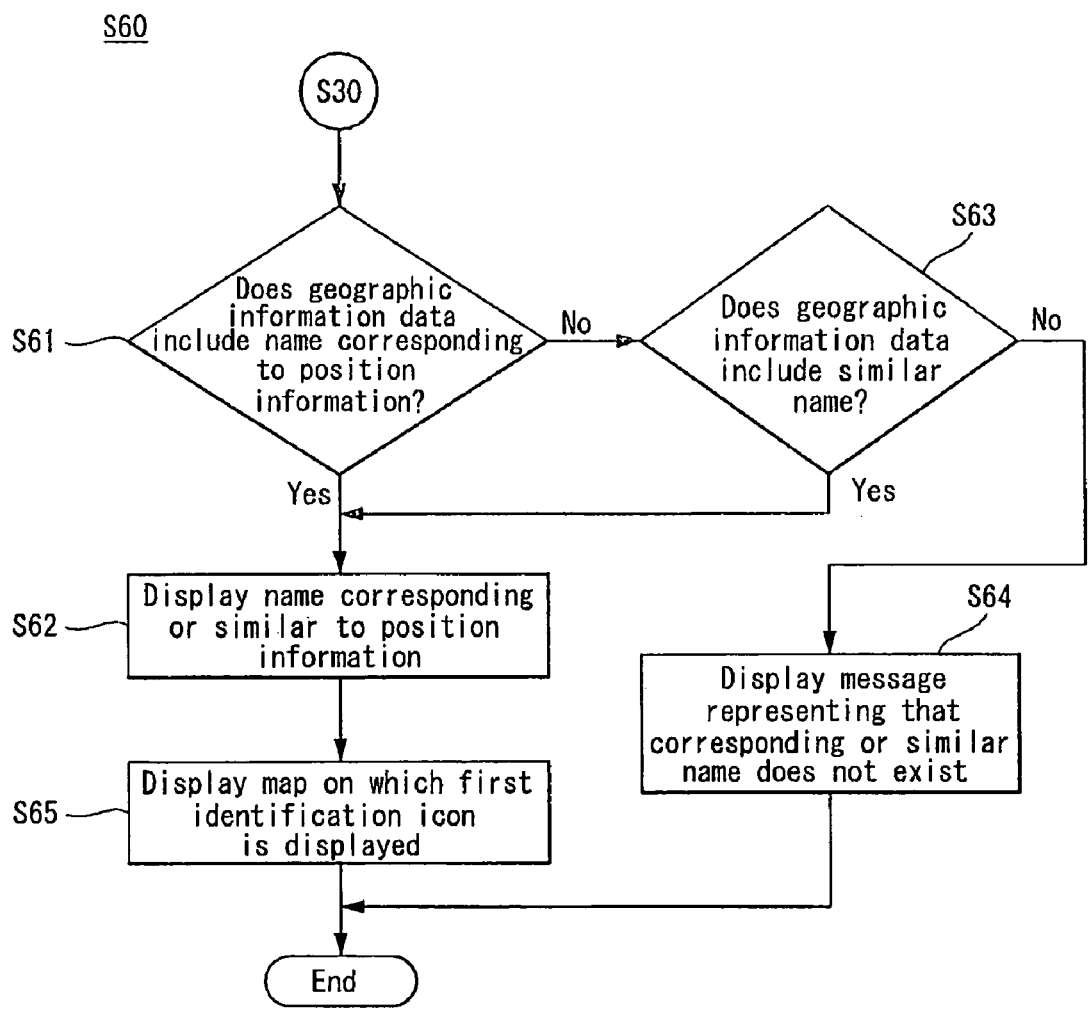
FIG. 12 is a flow chart illustrating a method of displaying a position corresponding to position information on a map in the method illustrated in FIG. 4.

Next, FIG. 12 is a flow chart illustrating a method of deriving position information (S30 in FIG. 4) and displaying a map including a position corresponding to the derived position information (S60 in FIG. 4). Referring to FIG. 12, the controller 180 determines whether a name corresponding to the position information exists in geographic information data including information corresponding to places included in the map M (S61). The geographic information data can also be stored in the memory 160. Further, the geographic information data includes the names of the places of the map M. The geographic information data and the map M can also be updated through the radio communication unit 110.

When the geographic data information does not include the name corresponding to the position information (No in S61), the controller 180 determines whether a name similar to the name corresponding to the position information exists (S63). For example, the position information received in a text message may be wrong because of a spelling error. Furthermore, the name of a place may not correspond to the actual used name of the place. Accordingly, the controller 180 can determine whether the geographic information data includes a similar name.

When the geographic information data includes the name corresponding or similar to the position information (Yes in S61), the controller 180 displays the name such that the user can select the name (S62). Then, when the user selects the displayed name, the controller 180 displays a map M on which the first identification icon I1 is indicated (S65).

When the geographic information data does not include the name corresponding or similar to the position information (No in S61 and S63), the controller 180 displays a message that the geographic information data does not include the name corresponding or similar to the position information (S64).

Figure 13A:
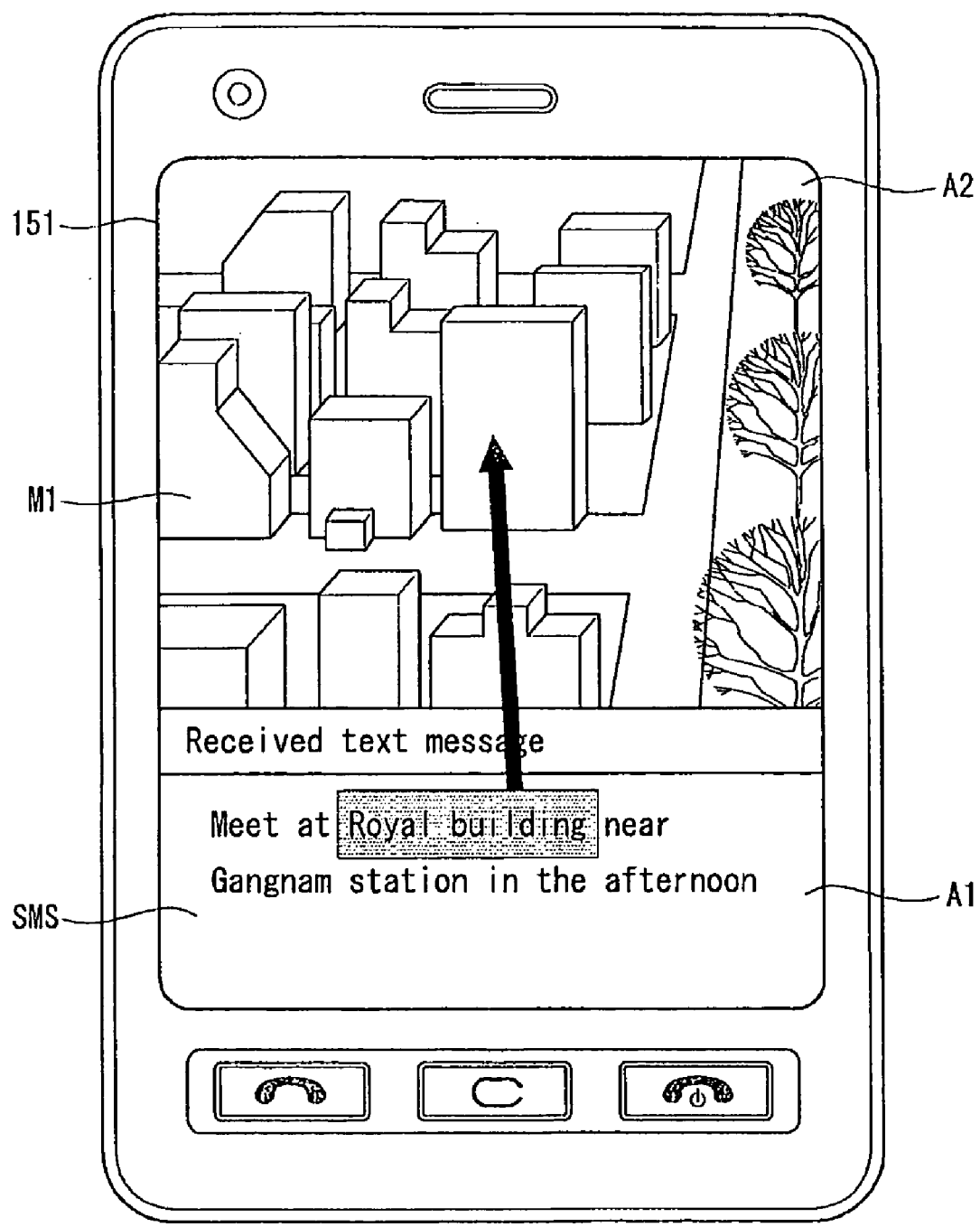
FIGS. 13A and 13B are overviews of display screens illustrating images according to the method of displaying a position on a map.
Figure 13B:
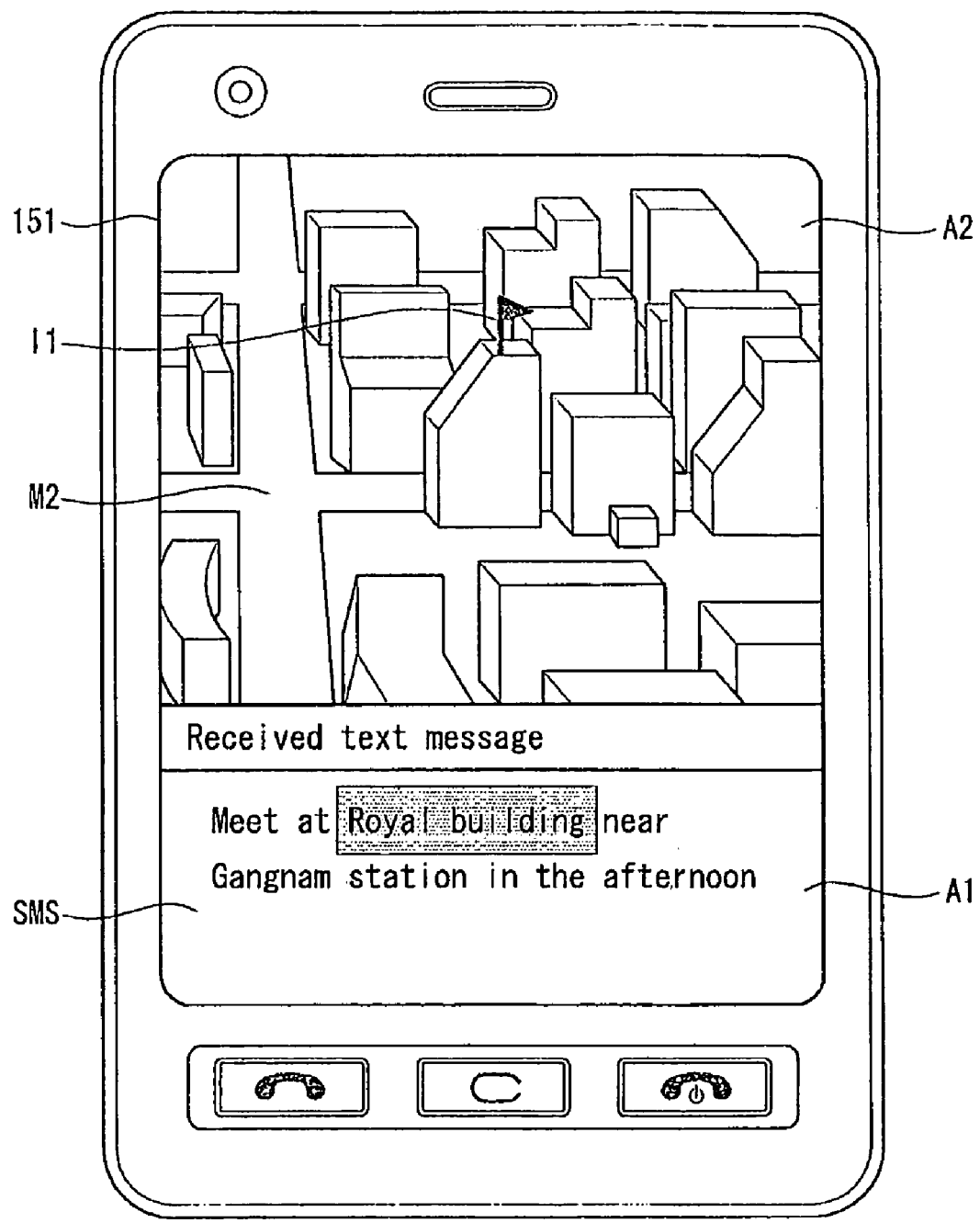

Next, FIGS. 13A and 13B are overviews of display screens illustrating a method of displaying a position on the map. Referring to FIG. 13A, a first map M1 is previously displayed in the second region A2. Further, an SMS text message including position information on a place that is not included in the map M is displayed in the first region A1.

Then, when the user selects the text "Royal building" from the SMS text message displayed in the first region A1 and drops the selected text "Royal building" on the second region A2, the controller 180 changes the first map M1 such that an area including the "Royal building" is displayed. For example, as shown in FIG. 13B, the controller 180 changes the first map M1 to a second M2 including the "Royal building" and displays the first identification icon I1 at the position of "Royal building."

Figure 14:
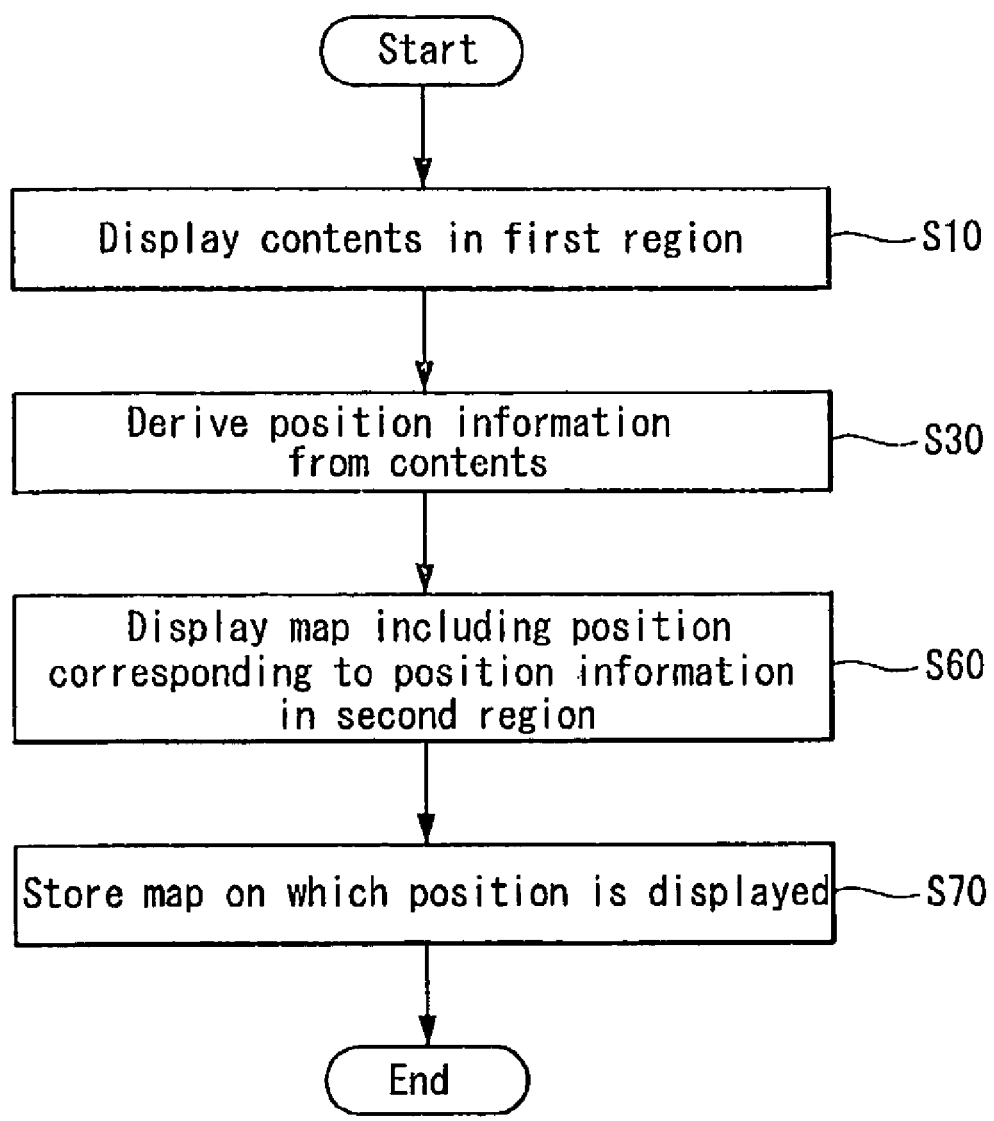
FIG. 14 is a flow chart illustrating a method of displaying a position on a map according to a second embodiment of the present invention.

Next, FIG. 14 is a flow chart illustrating a method of displaying a position on a map according to a second embodiment of the present invention. Note that FIG. 14 includes the same steps S10, S30 and S60 as in FIG. 4. However, FIG. 14 also includes storing the map on which the position is displayed (S70).

Further, the map M including the position corresponding to the position information is stored such that the user can immediately display the map M, if required. Furthermore, the stored map M can be transmitted to a recipient such that the recipient can confirm the position is accurate.

Figure 16A:
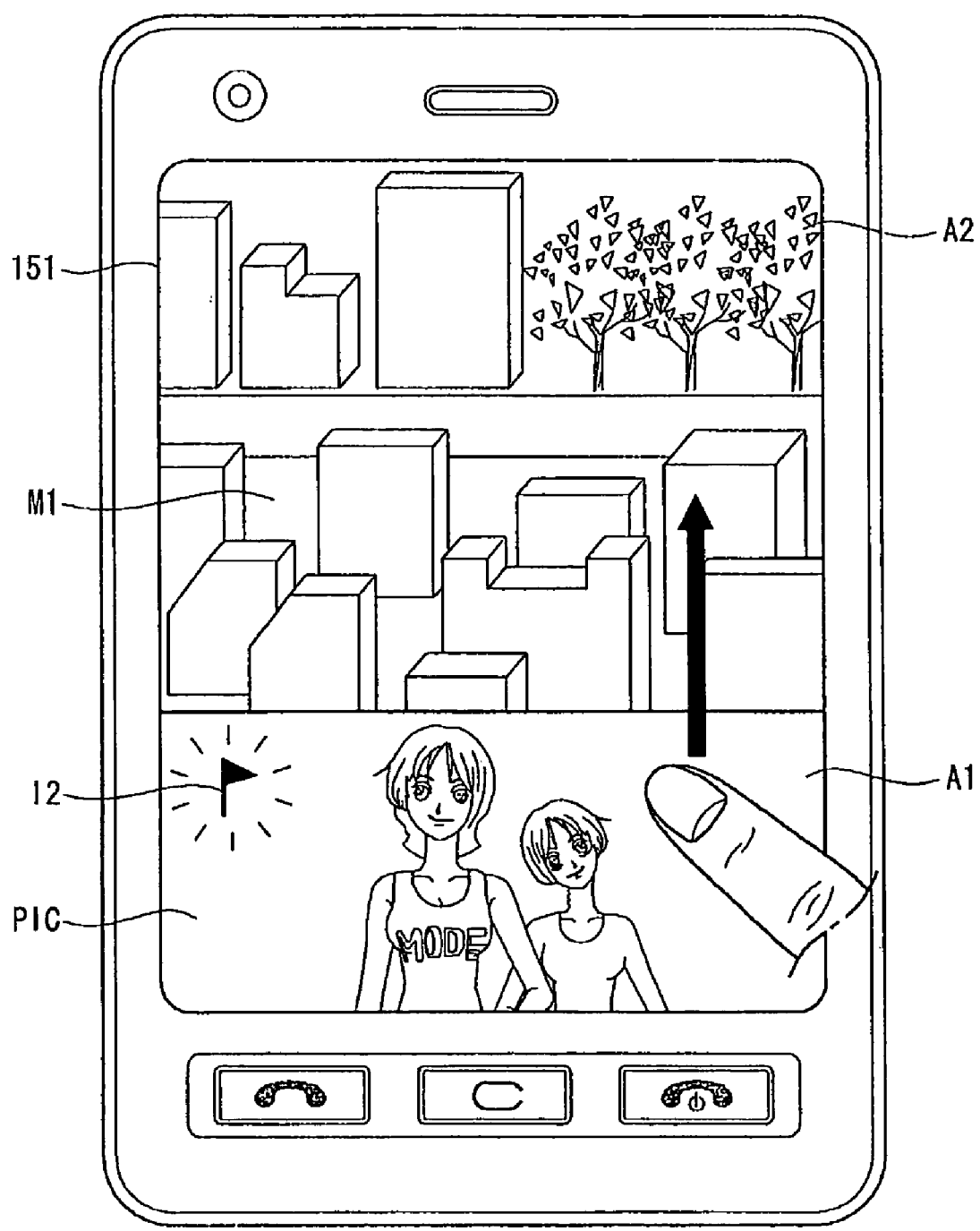
FIGS. 16A and 16B are overviews of display screens illustrating images according to the method in FIG. 15.
Figure 16B:
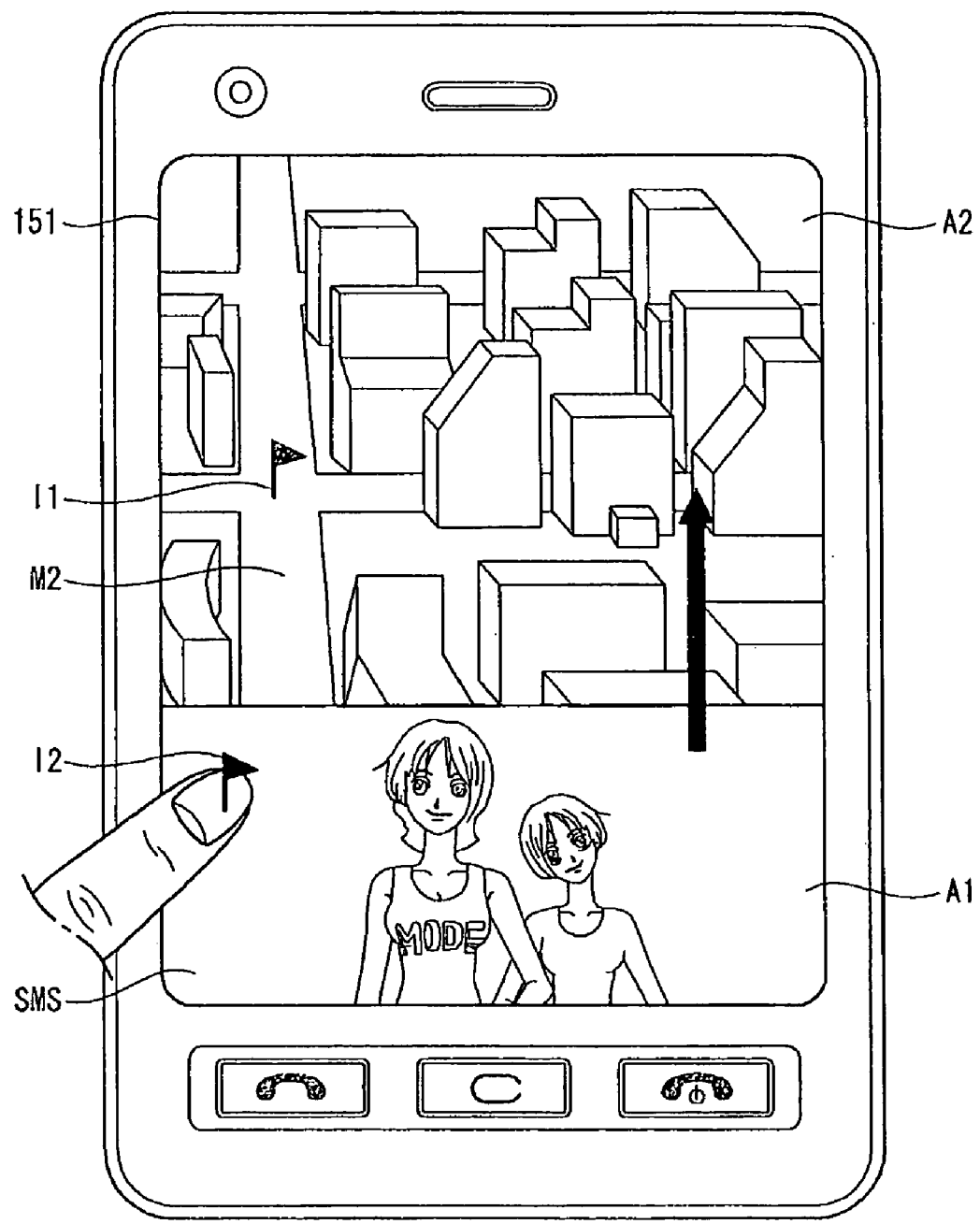

Next, FIG. 15 is a flow chart illustrating a method of displaying a position on a map according to a third embodiment of the present invention, and FIGS. 16A and 16B are overviews of display screens illustrate images displayed according to the method of FIG. 15. FIG. 15 also includes the same steps S10, S30 and S60 as in FIG. 4.

However, FIG. 15 also includes displaying a second identification icon on the contents indicating that the position corresponding to the position information included in the contents exists on the map M (S80). In more detail, when the contents include the position information, the controller 180 can determine whether the position corresponding to the position information exists on the map M. When the position corresponding to the position information exists on the map M, the second identification icon I2 can be displayed on the contents.

Then, when the second identification icon I2 displayed on the contents is selected (Yes in S82), the controller 180 moves the map to the position corresponding to the position information (S84). For example, referring to FIG. 16A, the image IMG can be displayed in the first region S1, and when the image IMG includes the header information illustrated in FIG. 7A, the position information can be derived from the image IMG.

Further, the image IMG is connected to the map M according to a user's touch or the controller 180 performs a predetermined operation such that the controller 180 can determine whether the position corresponding to the position information derived from the header information illustrated in FIG. 7A exists on the map M based on the position information. When the position exists on the map M, the controller 180 can display the second identification icon I2 displayed on the image IMG.

Referring to FIG. 16B, the user can touch the second identification icon I2 so as to enable the icon I2. When the second identification icon I2 is enabled, the map M displayed in the second region A2 displays the position corresponding to the position information included in the image IMG.

In addition, although FIG. 16A illustrates that the map M has already been displayed in the second region A2, it is also possible to display the second identification icon I2 while only the image IMG is displayed in the display unit and display the map M in the second region A2 when the second identification icon I2 is selected.

Further, the contents correspond to a text message, an image and a moving image in the aforementioned embodiments. However, the present invention can be applied to any contents if the contents include position information.

In addition, the controller 180 can also output or create at least one of an effective sound event and a haptic reaction event to correspond with the position information and map.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    displaying at least two regions comprising a first region and a second region of a display on the mobile terminal, wherein the first region displays contents comprising position information and the second region displays a first map;
    obtaining a selecting signal to the displayed contents, wherein the selecting signal corresponds to a selection of at least a section of the displayed contents;
    obtaining position information from the contents based on the selecting signal; and changing the first map to a second map comprising a specific position corresponding to the obtained position information, when obtaining a drag touch from the first region to the second region.

2. The method of claim 1, wherein the position information is included in at least one of a text, an image and a voice in the contents.

3. The method of claim 1, wherein the contents include a moving image and the section corresponds to a section of the moving image, and the obtaining position information step obtains the position information based on speech information included in the designated section of the moving image.

4. The method of claim 1, wherein the obtained selecting signal corresponding to a designation of the section of the contents includes a signal corresponding to start and end points of the section being touched and the section being dragged into the second region of the display.

5. The method of claim 1, wherein the section is designated through at least one of a touch input, a proximity input, a key input, a jog wheel input, a track ball input and a joystick input.

6. The method of claim 1, wherein the displaying step further comprises displaying the obtained position information such that the obtained position information can be viewed to determine if the obtained position information is accurate.

7. The method of claim 1, wherein the obtained position information includes at least one of a word, a phrase and a sentence included in the contents.

8. The method of claim 1, wherein, when the obtaining position information step obtains a plurality of position information items from the contents, the displayed position information includes the plurality of position information items such that one or more of the plurality of position information items can be selected and a position or positions corresponding to the selected position information items is displayed in the second region of the display.

9. The method of claim 1, further comprising:
storing the map including the position corresponding to the obtained position; and
transmitting the stored map to at least one other mobile terminal.

10. The method of claim 1, further comprising:
displaying an identification icon at the position to identify the position corresponding to the obtained position information.

11. The method of claim 1, further comprising:
displaying an identification icon indicating that the position exists on the map;
receiving an input signal corresponding to a selection of the displayed identification icon;
changing the first map in the second region to include the second map including the position corresponding to the obtained position information; and
displaying another identification icon at the position to identify the position corresponding to the obtained position information.

12. A mobile terminal, comprising:
a display unit configured to display at least two regions comprising a first region and a second region, wherein the first region displays contents comprising position information and the second region displays a first map; and
a controller configured to obtain a selecting signal to the displayed contents, wherein the selecting signal corresponds to a selection of at least a section of the displayed contents, obtain position information from the contents based on the selecting signal, and change the first map to a second map comprising a specific position corresponding to the obtained position information, when obtaining a drag touch from the first region to the second region.

13. The mobile terminal of claim 12, wherein the position information is included in at least one of a text, an image and a voice in the contents.

14. The mobile terminal of claim 12, wherein the contents include a moving image and the section corresponds to a section of the moving image, and
wherein the controller is further configured to obtain the position information based on speech information included in the designated section of the moving image.

15. The mobile terminal of claim 12, wherein the obtained selecting signal corresponding to a designation of the section of the contents includes a signal corresponding to start and end points of the section being touched and the section being dragged into the second region of the display.

16. The mobile terminal of claim 12, wherein the section is designated through at least one of a touch input, a proximity input, a key input, a jog wheel input, a track ball input and a joystick input.

17. The mobile terminal of claim 12, wherein the controller is further configured to control the display unit to display the obtained position information such that the obtained position information can be viewed to determine if the obtained position information is accurate.

18. The mobile terminal of claim 12, wherein the displayed position information includes at least one of a word, a phrase and a sentence included in the contents.

19. The mobile terminal of claim 12, wherein, when the controller obtains a plurality of position information items from the contents, the displayed position information includes the plurality of position information items such that one or more of the plurality of position information items can be selected, and
wherein the controller is further configured to control the display unit to display a position or positions corresponding to the selected position information items in the second region of the display unit.

20. The mobile terminal of claim 12, further comprising:
a memory configured to store the map including the position corresponding to the obtained position; and
a transmitter configured to transmit the stored map to at least one other mobile terminal.

21. The mobile terminal of claim 12, wherein the controller is further configured to control the display unit to display an identification icon at the position to identify the position corresponding to the obtained position information.

22. The mobile terminal of claim 12, wherein the controller is further configured to control the display unit to display an identification icon indicating that the position exists on the map, the receiving unit is further configured to receive an input signal corresponding to a selection of the displayed identification icon, and the controller is further configured to control the display unit to change the first map in the second region to include the second map including the position corresponding to the obtained position information and to display another identification icon at the position to identify the position corresponding to the obtained position information.

23. The method of claim 1, wherein the contents comprising the position information is received via a mobile terminal communication application that is completely independent of the first map when the contents are first received by the mobile terminal.

24. The mobile terminal of claim 12, wherein the contents comprising the position information is received via a mobile terminal communication application that is completely independent of the first map when the contents are first received by the mobile terminal.

* * * * *